United States Patent
Yamamoto et al.

(10) Patent No.: US 7,365,506 B2
(45) Date of Patent: Apr. 29, 2008

(54) MOTOR DRIVING DEVICE, MOTOR DRIVING METHOD, AND MOTOR APPARATUS

(75) Inventors: Yasunori Yamamoto, Hirakata (JP); Hideaki Mori, Sakai (JP); Yoshiaki Igarashi, Ikoma (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 130 days.

(21) Appl. No.: 11/151,057

(22) Filed: Jun. 13, 2005

(65) Prior Publication Data
US 2005/0275362 A1 Dec. 15, 2005

(30) Foreign Application Priority Data
Jun. 15, 2004 (JP) ............... 2004-177018

(51) Int. Cl.
*H02P 7/00* (2006.01)
(52) U.S. Cl. .............. 318/432; 318/434; 318/599; 318/811
(58) Field of Classification Search ........ 318/432, 318/434, 599, 811, 254, 138, 439
See application file for complete search history.

(56) References Cited

U.S. PATENT DOCUMENTS 5,844,388 A * 12/1998 Maiocchi ............... 318/439
6,646,407 B2 * 11/2003 Rahman et al. ......... 318/701

FOREIGN PATENT DOCUMENTS

JP 2001-037279 A 2/2001

* cited by examiner

*Primary Examiner*—Rina Duda
(74) *Attorney, Agent, or Firm*—Panitch Schwarze Belisario & Nadel LLP

(57) ABSTRACT

A motor driving part has half bridge circuits in which a high potential side drive transistor and a low potential side drive transistor are connected in series to each other, and a connection point therebetween serves as a stator winding driving terminal of each phase of a motor. A rotor position detector detects a rotor position of the motor and outputs a rotor position signal. The current phase detector detects the phase of a phase current flowing in the stator winding driving terminal. A voltage signal generator controls and generates a voltage profile signal such that a first phase difference that is a difference between the phase of the phase current and the phase of the rotor position signal is kept to a predetermined electrical angle. A driving signal generator generates a PWM signal that drives the drive transistor of each phase depending on the voltage profile signal.

25 Claims, 14 Drawing Sheets

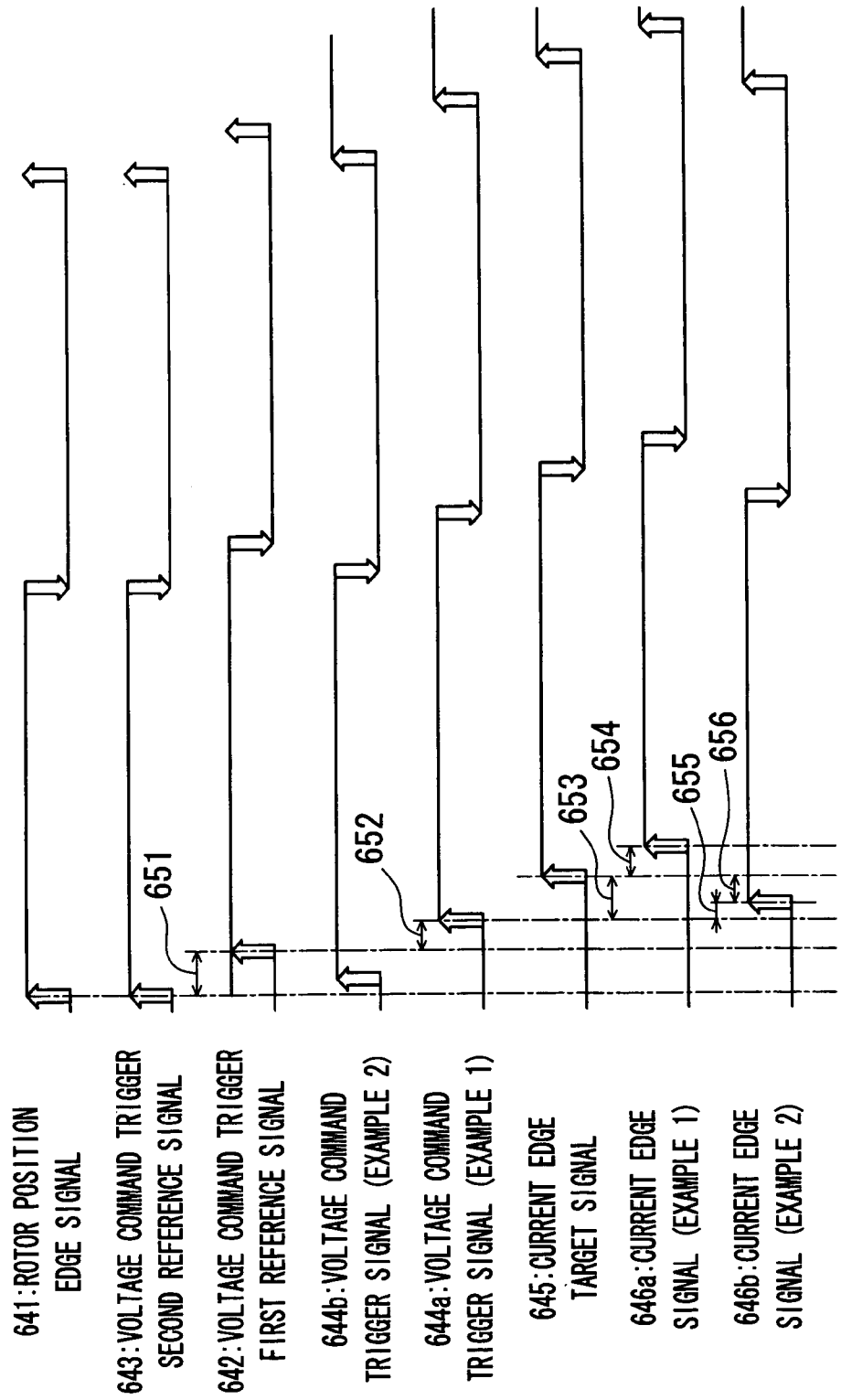

MOTOR DRIVING DEVICE, MOTOR DRIVING METHOD, AND MOTOR APPARATUS

BACKGROUND OF THE INVENTION

The present invention generally relates to a motor driving device, a motor driving method, and an electronic device having the motor driving device.

A brushless motor driving device detects a rotor position of a motor to be controlled, and sends a current to a stator winding according to the position signal. However, the phase of the position signal is sometimes shifted due to various factors, such as rotation number and load torque of the motor. Thereby, the electrification phase is shifted, the driving efficiency of the motor becomes low, and the power consumption increases. Moreover, when the motor is driven with the voltage having a rectangular waveform based on rotor position information which is obtained a few times per one rotation of motor, the motor vibrates and noise is generated during the rotation of the motor.

Japanese Unexamined Patent Publication 2001-037279 discloses motor driving devices of the first and second prior arts. Referring to FIGS. 14 and 15, the motor driving devices of the first and second prior arts are explained. FIGS. 14 and 15 show block diagrams of the motor driving devices of the first and second prior arts, respectively.

The motor driving device of the first prior art shown in FIG. 14 will be explained. In FIG. 14, a DC power source 1 provides power to the motor driving device. A current detector 4 detects the source current flowing in a motor driving part 2. A rotor position detector 13 outputs a position signal having a certain phase relation with a voltage induced in the stator winding of a plurality of phases according to the rotor rotating position of a permanent-magnet motor 3. A cycle measuring part 1401 measures a variable cycle of the position signal. A pulse generator 1402 generates a plurality of clock pulses in the variable cycle.

A peak hold part 1408 holds a peak value of the signal detected by the current detector 4. A rotation number detector 1405 counts the rotation number of the permanent-magnet motor 3, for example by counting the number of output rising edges per second with respect to one of the position signals. The rotation number detector 1405 then outputs the voltage signal Vf having a level according to the rotation number to an adder 1409 to execute F/V conversion. The adder 1409 adds the voltage signal levels output by the rotation number detector 1405 and the peak hold part 1408 in an analog manner. An A/D converter 1409 converts an analog voltage signal given from the adder 1409 to digital information, and outputs the digital information.

A phase estimating part 1403 has a counter for counting the number of the generated clock pulses, and estimates the rotor phase based on a counter value of the counter using the timing in which the position signal changes as a reference. A phase correcting part 1407 sets the correction value derived based on the output signal of the A/D converter 1406 to the counter at the timing when the position signal changes so as to correct the rotor phase. Particularly, the phase correcting part 1407 corrects the phase depending on, for example, the increase in the load torque of the motor 3 so that the commutation timing at the stator winding is advanced. A voltage signal generator 1404 generates a predetermined voltage signal depending on the rotor phase. A triangular wave generator 8 generates a triangular wave to generate a carrier wave of a pulse width modulation (PWM) signal. A driving signal generator 9 compares the signal level of the voltage signal to that of the carrier wave, to generate a driving signal. The motor driving part 2 sends a current to the stator winding of a plurality of phases according to the driving signal.

The motor driving device of the first prior art sends a current to each stator winding of the motor 3 according to torque current information output from the current detector 4, and rotation number information and phase information output from the rotor position detector 13.

The motor driving device of the second prior art shown in FIG. 15 will be explained below. The motor driving device of the second prior art has the configuration similar to that of the motor driving device of the first prior art. In FIG. 15, the same reference numerals denote the components that are similar or equal to in the first prior art, and the description thereof is omitted. The parts differing from the first prior art will be described below.

As shown in FIG. 15, the motor driving device of the second prior art does not have the adder 1409, the current detector 4 and the peak hold part 1408 apart from the configuration of the first prior art, but has a speed controller 1501 and a phase controller 1502. The speed controller 1501 compares the speed command given from outside with the rotation number detected by the rotation number detector 1405, and outputs the voltage command depending on that difference. The phase controller 1502 differential-amplifies the difference between the voltage command and the voltage signal Vf that is input from the rotation number detector 1405, to generate a phase command. Then the phase correcting part 1407 uses the digital data obtained by A/D-converting the phase command as a phase correction value PC.

The motor driving device of the second prior art sends a current to the stator winding according to the speed command that is input from outside, and the rotation number information and the phase information from the rotor position detector 13.

The motor driving devices of the first and second prior arts estimate the rotor phase according to the counter value of the counter. Thereby, the motor driving devices of the first and second prior arts obtain the rotor phase with higher resolution than the variable cycle, and drive the motor 3 with sine-wave voltage based on the detailed rotor phase information. In such a way, the motor driving devices of the first and second prior arts can reduce vibration and noise etc. generated from the motor, and can drive the motor with high efficiency.

In the motor driving devices of the first and second prior arts, the phase difference between the induced voltage of each phase and the phase information from the rotor position detector 13 is determined from a characteristic of each motor. The phase of the voltage to be applied to each stator winding is a predetermined value depending on the rotation number of the motor.

The motor driving devices of the prior art control the phase according to the predetermined value that is determined by the characteristic of each motor independently. Therefore, the predetermined value needs to be determined depending on electrical constants of resistance and inductance of the motor. In the motor driving devices controlling the motor with microcomputers, it is easy to change these predetermined values. The motor driving devices for the devices having an expensive and large-sized motor, such as washing machines and air-conditioners, control the phase with high accuracy in usage of the microcomputers. However, the motor driving devices for controlling relatively small-sized motor are required to be low in cost and high in versatility that is not depending on the structure and/or the characteristic of the motor.

The motor driving devices of the first and second prior arts have not realized the motor driving devices that are low in cost and high in versatility. The quantity of the phase correction varied by the rotation number and the load torque of the motor depends on the characteristic of each motor. The motor driving devices of the first and second prior arts are configured to drive a certain type of the motor. Therefore, the motor driving devices of the first and second prior arts can not execute the optimum phase correction in the case that the motor driving devices drive the motor having different electrical constants (e.g. resistance or inductance etc.) from the certain type of the motor.

The present invention is intended to provide a motor driving device and a motor driving method that are low in cost and can control the phase of the motor with high efficiency and high accuracy.

The present invention is intended to provide a motor driving device and a motor driving method that are low in cost and can control the phase of the motor with high efficiency and high accuracy without depending on the characteristic of the motor.

The present invention is intended to provide an electronic device that is low in cost and high in efficiency.

BRIEF SUMMARY OF THE INVENTION

For the purpose of solving the problem encountered in the above-mentioned prior arts, the present invention has configurations described below.

A motor driving device in one aspect of the present invention includes a motor driving part having a plurality of half bridge circuits in which a high potential side drive transistor and a low potential side drive transistor are connected in series to each other, and a connection point therebetween serves as a stator winding driving terminal of each phase of a motor; a rotor position detector for detecting a rotor position of the above-mentioned motor and outputting a rotor position signal; a current phase detector for detecting the phase of a phase current flowing in the above-mentioned stator winding driving terminal; a voltage signal generator for controlling and generating a voltage profile signal such that a first phase difference that is a difference between the phase of the above-mentioned phase current and the phase of the above-mentioned rotor position signal is kept to a predetermined electrical angle; and a driving signal generator for generating a PWM signal that drives the above-mentioned drive transistor of each phase depending on the above-mentioned voltage profile signal.

With the configuration mentioned above that is small in size and low in cost, the present invention can realize the motor driving device that controls the phase of the motor with high efficiency and with accuracy.

A motor driving device in another aspect of the present invention includes, in the motor driving device mentioned above, wherein in a state that no feedback of the above-mentioned phase difference for controlling the phase is executed, the voltage signal generator initializes the phase of a current phase signal so as to be further advanced from the phase of the above-mentioned rotor position signal by a first predetermined period more than the above-mentioned predetermined quantity, and generates the above-mentioned voltage-profile signals to start electrifying.

With the configuration mentioned above, the present invention can realize a motor driving device that locks the phase difference between the phase of phase current and the phase of the rotor position signal to the target value with high certainty without occurring deviation from scope for controlling through from activating state to steady state.

A motor driving device in other aspect of the present invention includes a motor driving part having a plurality of pairs, each pair has a drive transistor that drives a phase current flowing in a stator winding of each phase of a motor and a regenerative diode that is connected in parallel to the above-mentioned drive transistor; a current phase detector for comparing the potential of either end or the potential difference of both ends of the above-mentioned regenerative diode resulting from that a regenerative current is flowing in the above-mentioned regenerative diode in forward direction to a predetermined threshold, derives and outputs the phase of the phase current based on the comparison result; and a voltage signal generator outputting a voltage to be applied to the above-mentioned motor driving part based on the above-mentioned phase of the phase current.

With the configuration mentioned above that is small in size and low in cost, the present invention can realize the motor driving device that controls the phase of the motor with high efficiency and with accuracy.

A motor driving device in other aspect of the present invention includes a motor driving part having a plurality of half bridge circuits in which a high potential side drive transistor and a low potential side drive transistor are connected in series to each other, and a connection point therebetween serves as a stator winding driving terminal of each phase of a motor, a regenerative diode is connected in parallel to each of the above-mentioned drive transistors; a current phase detector having a potential shift circuit that shifts the potential of either end or the potentials of both ends of the above-mentioned high potential side regenerative diode, and the potential of either end or the potentials of both ends of the above-mentioned low potential side regenerative diode by predetermined voltages that are different from each other, respectively, a comparator for comparing the output signal from the above-mentioned potential shift circuit to a predetermined threshold, and a phase current phase detecting circuit inputting the output signal from the above-mentioned comparator, and deriving and outputting the phase of a phase current; and a voltage signal generator outputting a voltage to be applied to the above-mentioned motor driving part based on the above-mentioned phase of the phase current.

With the configuration mentioned above that is small in size and low in cost, the present invention can realize the motor driving device that detects the zero crossing points and controls the phase of the motor with high efficiency and with accuracy without depending on the characteristic of the motor.

A motor driving device in other aspect of the present invention includes a motor driving part having a plurality of half bridge circuits in which a high potential side drive transistor and a low potential side drive transistor are connected in series to each other, and a connection point therebetween serves as a stator winding driving terminal of each phase of a motor, a regenerative diode is connected in parallel to each of the above-mentioned drive transistors; a current phase detector for comparing the potential that is obtained by giving a first offset voltage to the voltage of at least one phase of the stator winding driving terminal to a predetermined threshold, and deriving and outputting the phase of a phase current based on the comparison result; and a voltage signal generator outputting a voltage to be applied to the above-mentioned motor driving part based on the above-mentioned phase of the phase current.

With the configuration mentioned above that is small in size and low in cost, the present invention can realize the motor driving device that detects the zero crossing points and controls the phase of the motor with high efficiency and with accuracy without depending on the characteristic of the motor.

A motor driving device in other aspect of the present invention includes a motor driving part having a plurality of half bridge circuits in which a high potential side drive transistor and a low potential side drive transistor are connected in series to each other, and a connection point therebetween serves as a stator winding driving terminal of each phase of a motor, a regenerative diode is connected in parallel to each of the above-mentioned drive transistors; a current phase detector deriving and outputting the phase of a phase current based on a first comparison result obtained by comparing a potential that is obtained by giving a first offset voltage to the voltage of at least one phase of the stator winding driving terminal to a first threshold, and a second comparison result obtained by comparing potential obtained by giving a second offset voltage to the voltage of the above-mentioned stator winding driving terminal to a second threshold; and a voltage signal generator outputting a voltage to be applied to the above-mentioned motor driving part based on the above-mentioned phase of the phase current.

With the configuration mentioned above that is small in size and low in cost, the present invention can realize the motor driving device that detects the zero crossing points and controls the phase of the motor with high efficiency and with accuracy without depending on the characteristic of the motor.

A motor driving device in other aspect of the present invention includes a motor driving part having a plurality of pairs, each pair has a drive transistor that drives a phase current flowing in a stator winding of each phase of a motor and a regenerative diode that is connected in parallel to the above-mentioned drive transistor; a current phase detector for comparing the potentials of both ends of the above-mentioned regenerative diode resulting from that a regenerative current flows in the above-mentioned regenerative diode in forward direction after giving a offset voltage to at least either potential, and deriving and outputting the phase of a phase current based on the comparison result; and a voltage signal generator outputting a voltage to be applied to the above-mentioned motor driving part based on the above-mentioned phase of the phase current.

An electronic apparatus in one aspect of the present invention has the above-mentioned motor driving device. The present invention can realize an electronic apparatus that is small in size and low in cost and controls the phase with high efficiency and high accuracy. The present invention can realize the motor driving method having the same effect as the above-mentioned motor driving device.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWINGS

FIG. 6 shows waveforms of each part of the motor driving device in accordance with Embodiment of the present invention;

It will be recognized that some or all of the figures are schematic representations for purposes of illustration and do not necessarily depict the actual relative sizes or locations of the elements shown.

DETAILED DESCRIPTION OF THE INVENTION

Embodiment specifically exemplifying the best mode for carrying out the present invention will be described below referring to the accompanying drawings.

Embodiment

Figure 1:
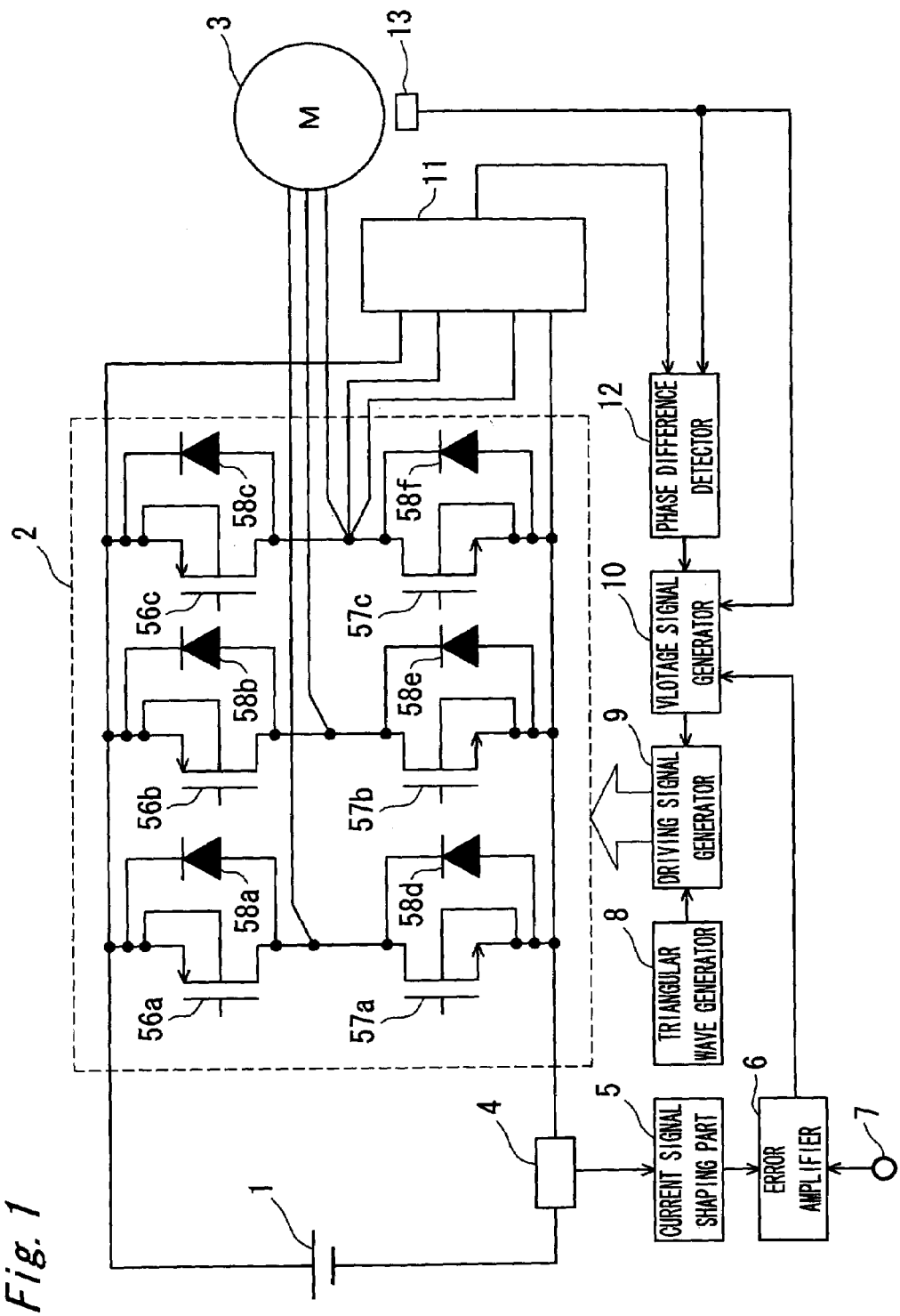
FIG. 1 is a block diagram showing a configuration of the motor driving device in accordance with Embodiment of the present invention.

Referring to FIGS. 1 through 13, a motor driving device and a motor driving method in accordance with Embodiment of the present invention will be described below. FIG. 1 is a block diagram showing a configuration of a motor driving device in accordance with Embodiment of the present invention.

A motor driving device in accordance with Embodiment of the present invention is a motor driving device for a spindle motor of an optical disk device.

A direct current power source 1 supplies power to the motor driving device. A current detector 4 detects a source current flowing in a motor driving part 2. A current signal shaping part 5 generates a current signal depending on a peak value of the source current detected by the current detector 4. An error amplifier 6 inputs the current signal that is output by the current signal shaping part 5 and a torque command signal that is input from outside via an input terminal 7 for torque command signals. The error amplifier 6 outputs an error signal that is a value obtained by subtracting the current signal from the torque command signal.

A rotor position detector 13 outputs a rotor position signal having a certain phase relation with a voltage induced in the stator winding of a plurality of phases of the motor 3. In this Embodiment of the present invention, the rotor position detector 13 includes three hall elements, each located at a point that is separated from other stator winding by a predetermined electrical angle. The rotor position signal that is output by the rotor position detector 13 is input to a phase difference detector 12 and a voltage signal generator 10.

The voltage signal generator 10 generates a sine-wave signal having a voltage value varying periodically according to the rotor electrical angle phase of the motor 3 detected by the rotor position detector 13. The voltage signal generator 10 determines the amplitude of the sine-wave based on the error signal that is output by the error amplifier 6. The voltage signal generator 10 outputs a sine-wave signal of three phases, each having a phase difference of 120 degrees with others.

The current phase detector 11 detects the phase of the phase current flowing in the stator windings and outputs a current phase signal. The phase difference detector 12 detects the phase difference between the rotor position signal and the current phase signal, and outputs the detected phase difference to the voltage signal generator 10. The voltage signal generator 10 corrects the phase of the sine-wave signal to be generated in relation to the phase of the rotor position signal, based on the phase difference signal from the phase difference detector 12.

A triangular wave generator 8 generates a triangular wave to generate a PWM signal. A driving signal generator 9 slices the triangular wave that is output from the triangular wave generator 8 by the output value that is input from the voltage signal generator 10, and generates a PWM signal. The driving signal generator 9 outputs the electrification signal of three phases that is a PWM signal. The driving signal generator 9 may include a level shift stage. The level shift stage converts the level of the signal that is input to the level shift stage into the level that is appropriate to the level of the source voltage of the motor driving part 2, and transmits the converted signal, in the case that voltage difference between the source voltage of the driving signal generator 9 and that of the next motor driving part 2 is present.

The motor driving part 2 includes high potential side drive transistors 56a, 56b, and 56c, low potential side drive transistors 57a, 57b and 57c, and regenerative diodes 58a, 58b, 58c, 58d, 58e, and 58f.

The motor driving part 2 inputs the electrification signal of three phases that is a PWM signal from the driving signal generator 9, and amplifies it to drive the motor 3.

The motor driving device in accordance with Embodiment of the present invention drives the motor so that the phase current flowing in the stator winding and the rotor position signal have a certain phase relation. The rotor position signal and the voltage induced in the stator winding have a predetermined phase difference depending on the configuration of the motor. The motor driving device in accordance with Embodiment of the present invention drives the motor with keeping constant the phase difference between the phase current flowing in the stator winding and the rotor position signal so that the phase current flowing in the stator winding and the voltage induced in the stator winding have an optimum phase difference. In such a way, the motor driving device in accordance with Embodiment of the present invention allows to keep the relation of the current and the induced voltage of the stator winding in optimum phase relation regardless of electronic constants. Then the motor driving device in accordance with Embodiment of the present invention can drive a motor with high efficiency.

In FIG. 1, the current detector 4 is provided between the low potential side common connection terminal of the drive transistors 57a, 57b, and 57c and the low potential side power source. Alternatively, the current detector 4 can be provided between the high potential side common connection terminal of the drive transistors 56a, 56b, and 56c and the high potential side power source, or provided in series on three-phase power feed line for the motor 3, or provided between one of the high potential side drive transistors 56a, 56b, and 56c and the high potential side common connection terminal. Alternatively, the current detector 4 can be provided between one of the low potential side drive transistors 57a, 57b, and 57c and the low potential side common connection terminal, or provided in a current mirror circuit (not shown) that is connected to one of the high potential side drive transistors 56a, 56b, and 56c in parallel, or provided in a current mirror circuit (not shown) that is connected to one of the low potential side drive transistors 57a, 57b, and 57c in parallel.

Figure 2:
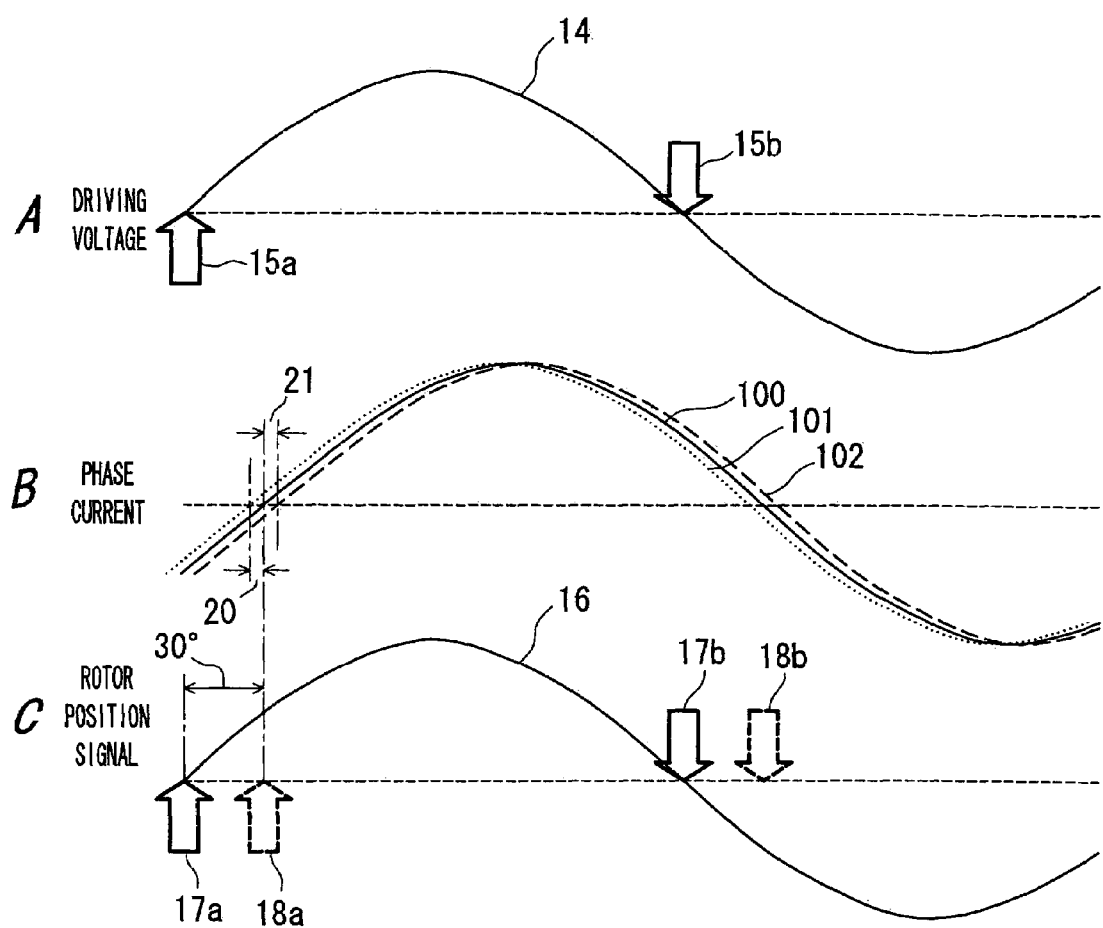
FIG. 2 shows a waveform of a driving voltage, waveforms of a phase current signal, and a waveform of a rotor position signal of the motor driving device in accordance with Embodiment of the present invention.

FIG. 2 shows one example regarding phase correction by the motor driving device in accordance with Embodiment of the present invention. Parts A to C of FIG. 2 show the waveforms of the driving voltage, the phase current (the driving current), the rotor position signal regarding one phase of the stator winding, respectively. In part A of FIG. 2, a waveform 14 regarding one phase of three-phase driving voltage that is output by the voltage signal generator 10 is illustrated. Zero crossing points 15a and 15b at which the sine-wave driving voltage crosses with the zero level of AC component (the reference potential for AC) are also illustrated.

Three phase current signals 100, 101, and 102 are illustrated in part B of FIG. 2. The phases of phase current signals 100, 101, and 102 delay from the phase of the driving voltage 14. The phase current signal 100 indicates the current waveform in the case that the phase of the phase current is in the optimum state from the viewpoint of high-efficiency. The phase current signal 101 indicates the current waveform in the case that the phase of the phase current advances from the optimum phase by a certain degrees. The phase current signal 102 indicates the current waveform in the case that the phase of the phase current delays from the optimum phase by a certain degrees. The phase of the rotor position signal shown in FIG. 2 differs according to the fixing position of the hall elements that constitute the rotor position detector 13.

In many motors, the motor driving efficiency is maximized in the case that the phase current signal zero-crosses at the position that advances or delays by 30 degrees from the position at which the rotor position signal crosses (zero-crosses) with the AC component. In FIG. 2 showing one example of each waveform, the driving efficiency of the motors is maximized in the case that the zero crossing position of the phase current delays from the zero crossing position of the rotor position signal by 30 degrees.

In the case that the phase current signal input by the phase difference detector 12 corresponds to the signal 100 shown in part B of FIG. 2, the zero crossing points thereof are accorded with the points 18a and 18b. The points 18a and 18b delay from the zero crossing points 17a and 17b of the rotor position signal 16 shown in part C of FIG. 2 by 30 degrees. The phase difference detector 12 transmits the phase difference information to the voltage signal generator 10. In this case, the waveform 14 output by the voltage signal generator 10 is appropriate. The voltage signal generator 10 does not correct the phase of the driving voltage to be output.

The phase difference detector 12 in accordance with Embodiment of the present invention stores an appropriate phase difference between the rotor position signal that is output by the hall element and the phase current. The phase difference detector 12 derives the value by subtracting the stored appropriate phase difference from the measured phase difference between the rotor position signal and the phase current, and transmits the derived value to the voltage signal generator 10. The appropriate phase difference is determined depending on the fixing position of the hall elements. Instead of the configuration in accordance with Embodiment of the present invention, the voltage signal generator 10 may store the appropriate phase difference between the rotor position signal output by the hall elements and the phase current. In this case, the voltage signal generator 10 subtracts the stored appropriate phase difference from the measured phase difference between the rotor position signal and the phase current to derive the value.

In the case that the phase current signal input by the phase difference detector 12 corresponds to the signals 101 shown in part B of FIG. 2, the zero crossing points thereof advance from the points 18a and 18b by the phase denoted by the reference numeral 20. The points 18a and 18b delay from the zero crossing points 17a and 17b of the rotor position signal 16 shown in part C of FIG. 2 by 30 degrees. In this case, the phase of the waveform 14 output by the voltage signal generator 10 advances from the optimum value. The phase difference detector 12 counts the period 20 and transmits the counter value as the phase difference information to the voltage signal generator 10. The voltage signal generator 10 corrects the angle information of the driving voltage profile or corrects the start timing of the driving voltage profile (as will hereinafter be described in detail).

In the case that the phase current signal input by the phase difference detector 12 corresponds to the signal 102 in part B of FIG. 2, the zero crossing points thereof delay from the points 18a and 18b by the phase denoted by the reference numeral 21. The points 18a and 18b delay from the zero crossing points 17a and 17b of the rotor position signal 16 shown in part C of FIG. 2 by 30 degrees. In this case, the phase of the waveform 14 output by the voltage signal generator 10 delays from the optimum value. The phase difference detector 12 counts the period 21 and transmits the phase difference information that is the counter value to the voltage signal generator 10. The voltage signal generator 10 corrects the phase of the driving voltage to be output or corrects the start timing of the driving voltage profile.

The control system may become unstable in the state that the phase-lock of the control for the phase correction in the voltage signal generator 10 is released and the phase of the phase current over-delays or over-advances. To prevent this, the voltage signal generator 10 determines an upper limit for the phase delay quantity of the phase current from the rotor position signal so that the zero crossing points 15a and 15b in the waveform 14 do not delay from the points 18a and 18b. The points 18a and 18b delay from the zero crossing points 17a and 17b of the rotor position signal 16 by the appropriate phase difference. The voltage signal generator 10 also determines a lower limit for the phase delay quantity of the phase current from the rotor position signal so that the phase of the zero crossing points 15a and 15b advance from the points 18a and 18b less than the phase corresponding to the first predetermined period.

By limiting the phase difference between the rotor position signal and the phase current in predetermined range, the over-advancing and the over-delaying of the phase current can be prevented in high rotation number area. By reducing the first predetermined value that is an upper advance limit of the phase depending on the increase of the rotation number, the unlocking of the control resulting from the phase advance in high rotation number area can be prevented.

Furthermore, in respect to the phase current in part B of FIG. 2, it is important to detect the zero crossing timing thereof. The zero crossing timing can be easily detected using the method described below. In addition, each phase of the three-phase driving voltage output from the voltage signal generator 10, each phase is shifted by 120 degrees with other, can be corrected independently. Alternatively, it is possible to generate one phase of the driving voltage signal by the phase correction, generate other two phases of voltage signal by shifting the generated one phase of the driving voltage signal by 120 degrees and 240 degrees, respectively, and output the driving voltage of three phases.

Figure 3:
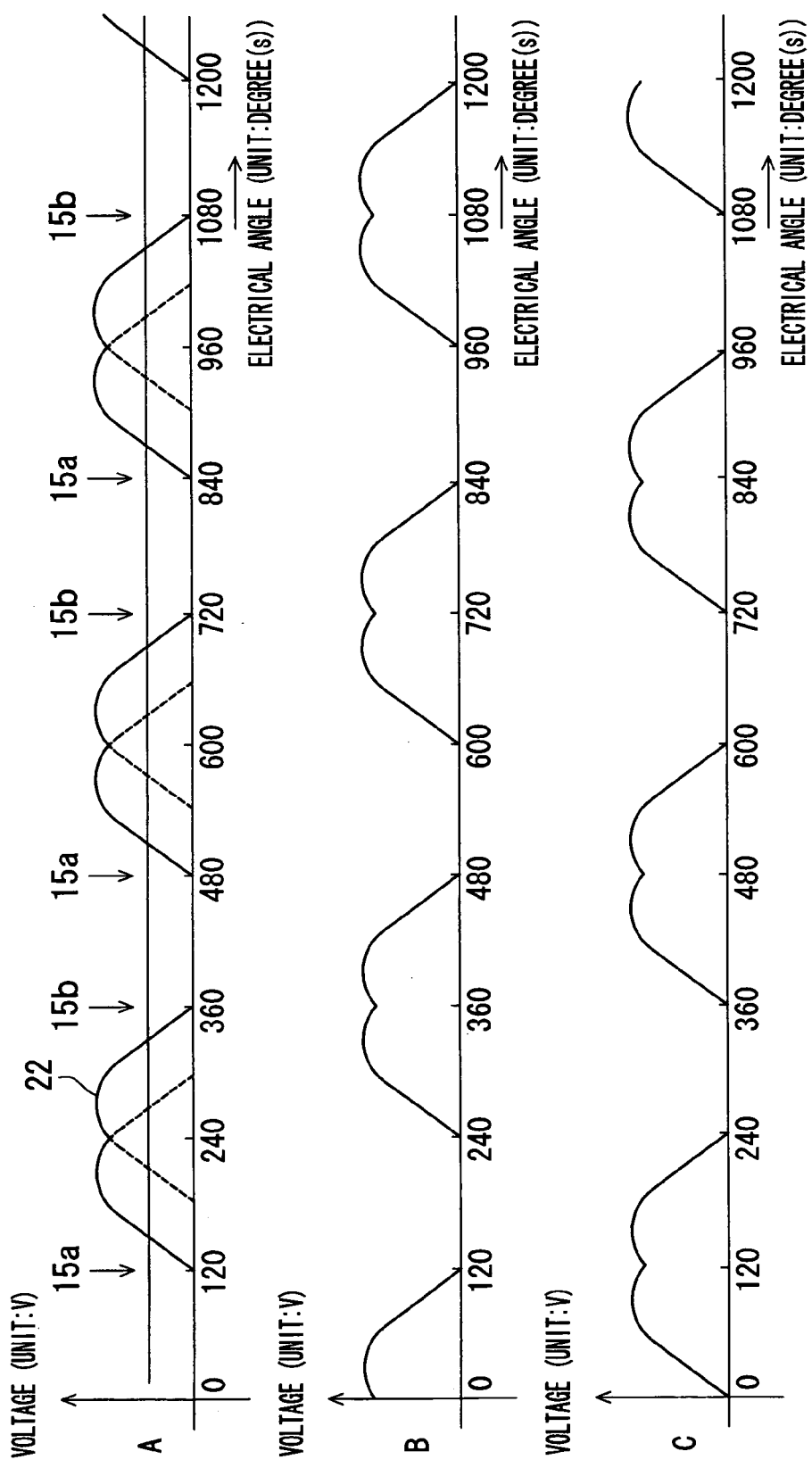
FIG. 3 shows waveforms of another driving voltage of the motor driving device in accordance with Embodiment of the present invention.

The voltage signal generator 10 in accordance with Embodiment of the present invention generates the sine-wave driving voltage 14 shown in part A of. FIG. 2. Instead of this, the voltage signal generator 10 can trisect the electrical angle of 360 degrees, as shown in FIG. 3, and output the waveform 22 of three phases, each phase of the driving voltage cross the zero level at an interval of 120 degrees. Two upper peaks of each phase in driving voltages 22 shown in FIG. 3 are shifted by 60 degrees each other. The voltage signal generator 10 corrects the phase regarding the zero crossing points 15a and 15b using the similar method mentioned above.

Figure 4:
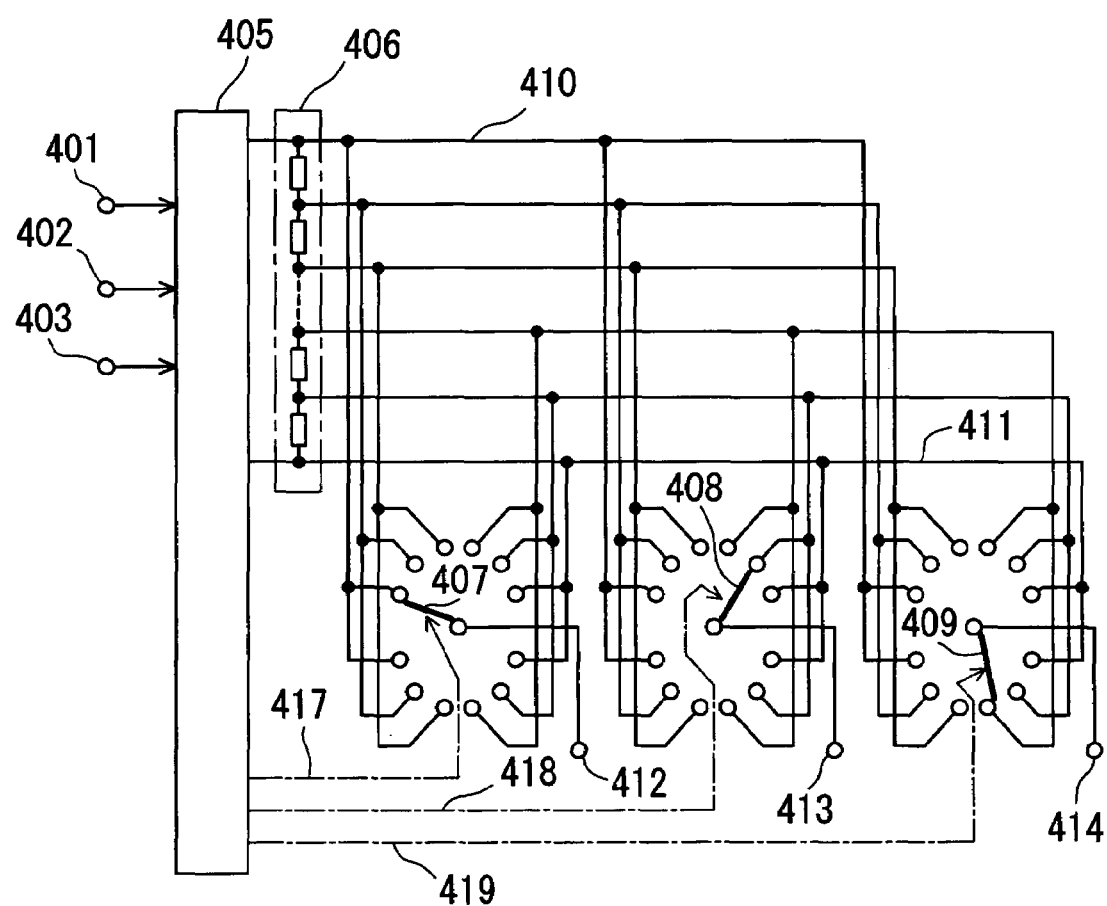
FIG. 4 is a block diagram showing a specific configuration of voltage signal generator in accordance with Embodiment of the present invention.

FIG. 4 is a block diagram showing the configuration of the voltage signal generator 10 in accordance with Embodiment of the present invention. The voltage signal generator 10 generates the driving voltage 14 in part A of FIG. 2 and the other two driving voltages obtained by shifting the driving voltage 14 by 120 degrees and 240 degrees, respectively. In FIG. 4, an input terminal 401 for error signals that are output by the error amplifier 6, an input terminal 402 for rotor position signals, an input terminal 403 for phase difference signals that are output by the phase difference detector 12, a controller 405, a resistance connection body 406 constituted by a plurality of resistances connected in series, switches 407, 408, and 409, a highest potential line 410, a lowest potential line 411, an output terminal 412 for the phase driving voltage of the first phase, an output terminal 413 for the driving voltage of the second phase, and an output terminal 414 for the driving voltage of the third phase are illustrated.

The controller 405 inputs the error signal from the error amplifier 6, and outputs the highest potential and the lowest potential of the sine-wave driving voltage to the highest potential line 410 and the lowest potential line 411, respectively. The controller 405 also inputs the rotor position signal and the phase difference signal, and outputs the phase signals of the first phase, the second phase, and the third phase corresponding to each phase of the driving voltage to the control terminals 417, 418, and 419 of the switches 407, 408, and 409, respectively. The resistance connection body 406 divides the voltage between the voltage of the highest potential line 410 and the voltage of the lowest potential line 411 to generate the voltage at various phases of a quasi-sine-wave voltage signal in which the two voltage values serve as upper and lower peaks, and outputs the voltage to each contact of the switches 407, 408, and 409. A function of the voltage that is formed by a group of the voltages input to each contact of switches 407, 408, and 409 is hereinafter referred as a "voltage profile". In this Embodiment, the voltage profile is quasi-sine-wave voltage. The voltage profile may be a waveform shown in FIG. 3, for example. The switches 407, 408, and 409 switch the contacts in accordance with the phase signals of the first phase, the second phase, and the third phase that are input to the control terminal of each switch. Then the switches 407, 408, and 409 output each voltage that is input to each contact in turn, and generate sine-wave driving voltages of the first phase, the second phase, and the third phase, respectively.

The output terminals 412, 413, and 414 output the sine-wave driving voltages of the first phase, the second phase, and the third phase to the driving signal generator 9. As shown in FIG. 4, the switches 407, 408, and 409 respectively have twelve contacts and output the driving voltages using the electrical angle of 30 degrees as a unit.

When the motor is activated, the phase delay quantity of the phase current from the rotor position signal is initialized to be in the range defined by the upper limit and the lower limit mentioned above so that the zero crossing points 15a and 15b in the waveform of the driving voltage 14 do not delay from the points 18a and 18b, and do not advance from the points 18a and 18b by more than the first predetermined period. The points 18a and 18b delay from the zero crossing points 17a and 17b of the rotor position signal 16 by an appropriate phase difference (which is the zero crossing points of the phase current in the case that the motor 3 is controlled appropriately).

The controller 405 delays the phases of the phase signals (to be output to the control terminals 417, 418, and 419) to be output in the case that the zero crossing points' phase of the phase current input by the phase difference detector 12 advances from the points 18a and 18b. The controller 405 advances the phases of the phase signals (to be output to the control terminals 417, 418, and 419) to be output in the case that the zero crossing points' phase of the phase current input by the phase difference detector 12 delays from the points 18a and 18b. The points 18a and 18b delay from the zero crossing points 17a and 17b of the rotor position signal by 30 degrees.

Figure 5:
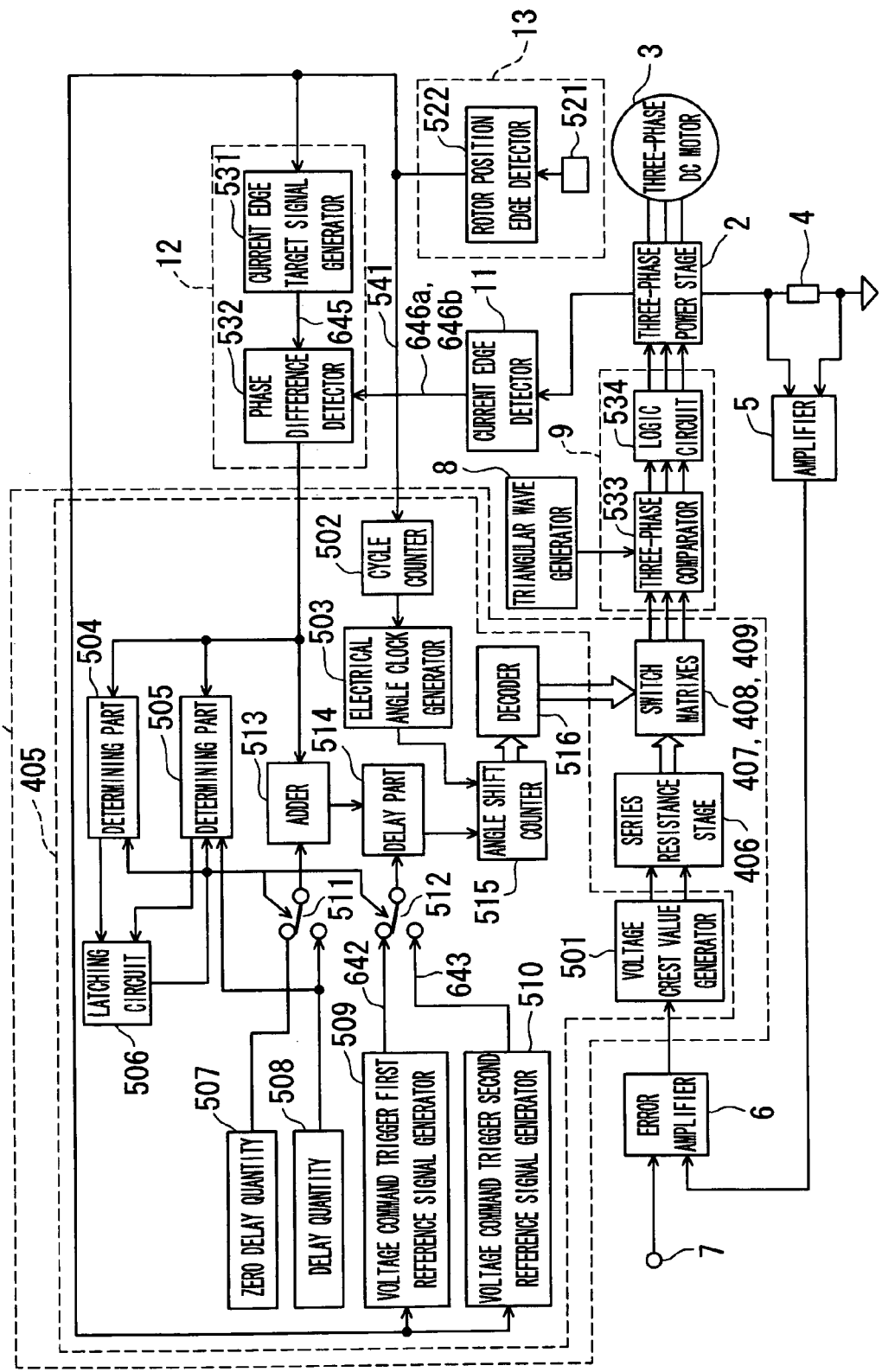
FIG. 5 is a block diagram showing the further specific configuration of the motor driving device in accordance with Embodiment of the present invention.

FIG. 5 is a block diagram showing the further specific configuration of the device for driving a motor in accordance with Embodiment of the present invention. In FIG. 5, a three-phase power stage 2 that is the motor driving part, the three-phase DC motor 3, a resistance 4 that is the current detector, an amplifier 5 that is the current signal shaping part, the error amplifier 6, an input terminal 7 for torque command signals, a triangular wave generator 8, the driving signal generator 9, the voltage signal generator 10, a current edge detector 11 that is the current phase detector, the phase difference detector 12, and the rotor position detector 13 are illustrated. Each block shown in FIG. 5 corresponds to FIG. 1.

The rotor position detector 13 has rotor position sensors 521 that are hall elements, and a rotor position edge detector 522 for detecting the edge of the output signal of the rotor position sensors 521 and outputting the rotor position signal.

The phase difference detector 12 has a current edge target signal generator 531 and a phase difference detector 532. The current edge target signal generator 531 inputs the rotor position signal and generates current edge target signal 645 obtained by shifting the rotor position signal by a predetermined phase quantity. The current edge target signal 645 is the control target position of the current edge signal 646 (646a or 646b). "The predetermined phase quantity" is the appropriate phase difference between the rotor position signal and the phase current. In this embodiment, the current edge target signal 645 is a signal obtained by delaying the rotor position signal by phase of 30 degrees. The phase difference detector 532 detects the phase difference between the current edge target signal 645 and the measured phase current that is output from the current phase detector 11, and outputs a phase difference signal.

The voltage signal generator 10 includes the controller 405, the series resistance stage 406 that is a resistance connection body, and switch matrixes 407, 408, and 409. The controller 405 has a voltage crest value generator 501, a cycle counter 502, an electrical angle clock generator 503, a determining part 504 and 505, a latching circuit 506, a zero delay quantity 507, a delay quantity 508 between voltage trigger references, a voltage command trigger first reference signal generator 509, a voltage command trigger second reference signal generator 510, switches 511 and 512, an adder 513, a delay part 514, an angle shift counter 515, and a decoder 516.

The voltage command trigger first reference signal generator 509 inputs the rotor position signal and generates a voltage command trigger first reference signal 642 obtained by advancing the current edge target signal 645 by a predetermined phase quantity. The phase quantity to be advanced is a predetermined electrical angle. The voltage command trigger first reference signal generator 509 has a counter, an operating part, and a delaying circuit. The counter of the voltage command trigger first reference signal generator 509 inputs clocks, and counts the cycle of the rotor position edge signal (or the divided cycle thereof). The operating part of the voltage command trigger first reference signal generator 509 divides the counter value of the cycle of the rotor position edge signal by a predetermined value, and derives a counter value of an advance quantity of the phase (practically, a delay quantity of the phase from the leading rotor position signal). The delaying circuit of the voltage command trigger first reference signal generator 509 generates a voltage command trigger first reference signal 642 obtained by advancing the rotor position signal by predetermined electrical angle (or obtained by delaying the leading rotor position signal by predetermined electrical angle), based on the derived counter value.

The voltage command trigger second reference signal generator 510 inputs the rotor position signal and generates a voltage command trigger second reference signal 643 obtained by advancing the current edge target signal 645 by a predetermined quantity. The advancing quantity of the phase in the voltage command trigger second reference signal generator 510 is a predetermined electrical angle and is larger than that in the voltage command trigger first reference signal generator 509. The voltage command trigger second reference signal generator 510 is similar to the voltage command trigger first reference signal generator 509 except in respect of having a different advance quantity of the phase.

The switch 512 inputs the voltage command trigger first reference signal 642 output by the voltage command trigger first reference signal generator 509 and the voltage command trigger second reference signal 643 output by the voltage command trigger second reference signal generator 510, and selects either of them to output it.

The switch 511 inputs the zero delay quantity 507 and the delay quantity 508 between voltage trigger references, selects either of them to output it. The delay quantity 508 between voltage trigger references is the differential time between the voltage command trigger first reference signal 642 and the voltage command trigger second reference signal 643 (denoted by the reference numeral 651 in FIG. 6). The adder 513 inputs the phase difference between the current edge target signal 645 and the current edge signal 646 (646a or 646b) (the phase difference signal output by the phase difference detector 12) and the delay time output by the switch 511. Then the adder 513 outputs the time obtained by adding both of them.

The delay part 514 inputs the voltage command trigger first or second reference signal (the reference signal) output by the switch 512. Then the delay part 514 generates the voltage command trigger signal 644 (644a or 644b) that is delaying from the reference signal by predetermined period. The delay quantity in the delay part 514 is the delay time to be output by the adder 513.

The voltage command trigger signal 644 (644a or 644b) is generated by delaying the voltage command trigger first reference signal 642 or the voltage command trigger second reference signal 643. For that reason, the voltage command trigger signal 644 (644a or 644b) will not advance from the voltage command trigger first reference signal 642 or the voltage command trigger second reference signal 643. Therefore, the voltage command trigger first reference signal 642 or the voltage command trigger second reference signal 643 is available as the limit for the case that the phase of the voltage command trigger signal 644 (644a or 644b) advances by the maximum phase.

In addition, the voltage command trigger first reference signal 642 and the voltage command trigger second reference signal 643 advance from the current edge target signal 645 by the predetermined electrical angle in the description above. Alternatively, it is possible to use the signal obtained by advancing the current edge target signal 645 by a predetermined time utilizing the cycle information, as the voltage command trigger signal 644 (644a or 644b).

The voltage command trigger first reference signal generator 509 inputs the rotor position signal and generates the voltage command trigger first reference signal 642 obtained by advancing the current edge target signal 645 by a predetermined phase quantity. The advance quantity of the phase is a predetermined time. The voltage command trigger first reference signal generator 509 has the counter and the delaying circuit. The counter of the voltage command trigger first reference signal generator 509 inputs clocks to count the cycle of the rotor position edge signal (or to count the divided cycle thereof). The delaying circuit of the voltage command trigger first reference signal generator 509 generates the voltage command trigger first reference signal 642 obtained by advancing the rotor position signal by predetermined time (or obtained by delaying the leading rotor position signal by predetermined time) based on the derived counter value. A similar is true on the voltage command trigger second reference signal.

Now, the motor 3 is supposed to be controlled in usage of the voltage command trigger first reference signal 642. The switch 511 selects the zero delay quantity to enable it. The switch 512 selects the voltage command trigger first reference signal 642 to enable it. At this condition, an operation described below is executed in the case that the phase of the voltage command trigger signal 644 is required to be advanced from the voltage command trigger first reference signal 642. That is, in the case that the current edge signal 646 (646a or 646b) delays from the current edge target signal 645 in the state that the delay time of the voltage command trigger signal 644 (644a or 644b) from the voltage command trigger first reference signal 642 is zero.

The determining part 504 determines whether the current edge signal 646 (646a or 646b) delays from the current edge target signal 645 or not. The determining part 505 determines whether the delay time (the phase difference signal output from the phase difference detector 12) of the current edge signal 646 (646a or 646b) from the current edge target signal 645 (the phase thereof is the same that of the voltage command trigger first reference signal 642) is smaller than the delay quantity 508 between voltage trigger references (the phase difference 651 between the voltage command trigger second reference signal 643 and the voltage command trigger first reference signal 642) or not.

The latching circuit 506 inputs the decision results that are output from the determining part 504 and 505, respectively. Then the latching circuit 506 switches the switches 511 and 512 in the case that the current edge signal 646 (646a or 646b) delays from the current edge target signal 645, in the state that the delay time of the voltage command trigger signal 644 (644a or 644b) from the voltage command trigger first reference signal 642 is zero. The latching circuit 506 switches the switch 512 to enable the voltage command trigger second reference signal 643 as the next reference signal of the voltage command trigger signal 644 (644a or 644b). Therewithal, since the latching circuit 506 switches the switch 511, the adder 513 adds the phase difference output from the phase difference detector 12 and the delay quantity 508 between voltage trigger references (the difference time 651 between the voltage command trigger first reference signal 642 and the voltage command trigger second reference signal 643), and outputs the added result.

In the case that the decision result of the determining part 505 indicates that the delay time (the phase difference signal output from the phase difference detector 12) of the current edge signal 646 (646a or 646b) from current edge target signal 645 is smaller than the phase difference (the difference time 651 in FIG. 6) between the voltage command trigger first reference signal 642 and the voltage command trigger second reference signal 643, the output signal from the adder 513 is a positive value.

The delay part 514 inputs the voltage command trigger second reference signal 643 output from switch 512 and the output signal from the adder 513, generates the voltage command trigger signal 644 (644a or 644b) delaying from the voltage command trigger second reference signal 643 by the predetermined time, and outputs it.

Next, the motor 3 is supposed to be controlled in usage of the voltage command trigger second reference signal 643. The switch 511 selects the delay quantity 508 between voltage trigger references (the difference time 651 between the voltage command trigger first reference signal 642 and the voltage command trigger second reference signal 643) to enable it. The switch 512 selects the voltage command trigger second reference signal 643 to enable it.

The determining part 504 determines whether the phase of the current edge signal 646 (646a or 646b) advances from the phase of current edge target signal 645 or not. The determining part 505 determines whether the delaying time of the voltage command trigger signal 644 from the voltage command trigger second reference signal 643 (the output signal from the adder 513) is larger than the delay quantity 508 between voltage trigger references (the phase difference 651 between the voltage command trigger second reference signal 643 and the voltage command trigger first reference signal 642).

The latching circuit 506 switches the operation of the determining parts 504 and 505.

The latching circuit 506 inputs the decision result from the determining parts 504 and 505 to switch the switches 511 and 512 in the case that the current edge signal 646 (646a or 646b) advances from the current edge target signal 645 in the state that the delaying time of the voltage command trigger signal 644 from the voltage command trigger second reference signal 643 (the output signal from the adder 513) is the same as the delay quantity 508 between voltage trigger references (the phase difference 651 between the voltage command trigger second reference signal 643 and the voltage command trigger first reference signal 642). The latching circuit 506 switches the switch 512 to enable the voltage command trigger first reference signal 642 as the reference signal of the next voltage command trigger signal 644 (644a or 644b). Therewithal, since the latching circuit 506 switches the switch 511, the adder 513 adds the phase difference output from the phase difference detector 12 and the zero delay quantity 507, and outputs the added result.

In the case that the decision result of the determining part 505 indicates that the delay time of the voltage command trigger signal 644 from the voltage command trigger second reference signal (the output signal from the adder 13) is larger than the delay quantity 508 between voltage trigger references (the phase difference 651 between the voltage command trigger second reference signal 643 and the voltage command trigger first reference signal 642), the output signal from the adder 513 is a positive value.

The delay part 514 inputs the voltage command trigger second reference signal 643 output from switch 512 and the output signal from the adder 513, generates the voltage command trigger signal 644 (644a or 644b) delaying from the voltage command trigger second reference signal 643 by predetermined period, and outputs it.

The cycle counter 502 inputs the rotor position edge signal 641 and the predetermined clock to count the cycle of the rotor position edge signal. The electrical angle clock generator 503 derives the count value per predetermined electrical angle on the basis of the count value indicating the cycle of the rotor position edge signal, and steps an estimated rotor angle using the count value.

The angle shift counter 515 inputs the current estimated rotor angle output from the electrical angle clock generator 503 and the voltage command trigger signal 644 (644a or 644b) output from the delay part 514, and outputs an electrical angle advancing from the current estimated rotor angle by the angle indicated by the voltage command trigger signal 644 (644a or 644b).

The decoder 516 generates a control signal for controlling switches 407, 408, and 409 according to the electrical angle output from the angle shift counter 515, and outputs it.

The voltage wave crest generator 501 inputs the error signal output from the error amplifier 6, and outputs the highest potential and the lowest potential of the sine wave driving voltage to the highest potential line 410 and the lowest potential line 411, respectively.

The series resistance stage 406 generates a voltage at each contact point of the switches 407, 408, and 409. The switch matrixes (SW matrixes) 407, 408, and 409 generate a voltage profile signal of three phases.

The driving signal generator 9 includes a three-phase comparator 533 and a logic circuit 534 for preventing a through current. The three-phase comparator 533 slices the triangular wave that is output from the triangular wave generator 8 with the voltage profile signal of three phases that is output from the voltage signal generator 10 to generate a PWM signal. The logic circuit 534 is a circuit for preventing a through current from passing through the high potential side drive transistor and the low potential side drive transistor connected in series to each other.

The three-phase power stage 2 inputs the PWM signal of three phases to drive the motor 3.

FIG. 6 shows waveforms at each part of FIG. 5. In FIG. 6, the difference 651 indicates the phase difference between the voltage command trigger second reference signal 643 and the voltage command trigger first reference signal 642. The waveform 644a indicates a voltage command trigger signal in the case that the motor 3 is driven in usage of the voltage command trigger first reference signal 642. The difference 652 indicates a variable quantity of the delay quantity (a variable quantity in which the delay quantity is in a decreasing direction) of the voltage command trigger signal 644a from the voltage command trigger first reference signal 642.

The waveforms 646a and 646b indicate the current edge signals in the case that the motor 3 is driven in usage of the voltage command trigger first reference signal 642. The difference 653 indicates a delay quantity of a current edge target signal 645 from the voltage command trigger signal 644a of the motor system. The difference 655 indicates a delay quantity of the current edge signal 646b from the voltage command trigger signal 644a of the motor system.

The difference 654 indicates that the current edge signal 646a delays from the current edge target signal 645. Since the difference 654 is a delay quantity, the adder 513 shortens the delay time to be output by the delay quantity 654 to decrease the delay quantity 654 due to the control.

The difference 656 indicates that the current edge signal 646b advances from the current edge target signal 645. Since the difference 656 is an advance quantity, the adder 513 lengthens the delay time to be output by the delay quantity 654 to increase the delay quantity 654 due to the control.

The waveform 644b indicates the voltage command trigger signal in the case that the motor 3 is driven in usage of the voltage command trigger second reference signal 643.

Figure 7A:
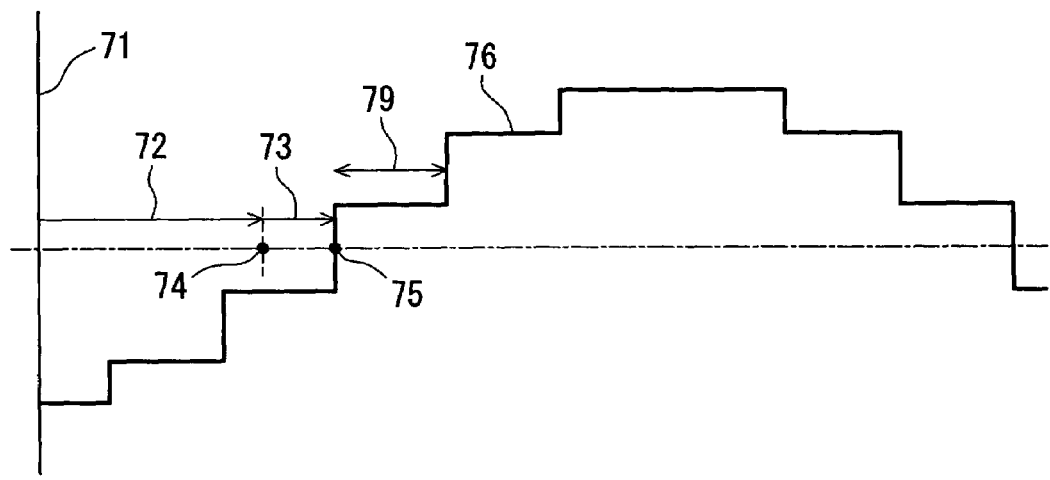
FIG. 7A shows the phase shifting in accordance with Embodiment of the present invention in the case that the phase of the driving voltage is delayed.
Figure 7B:
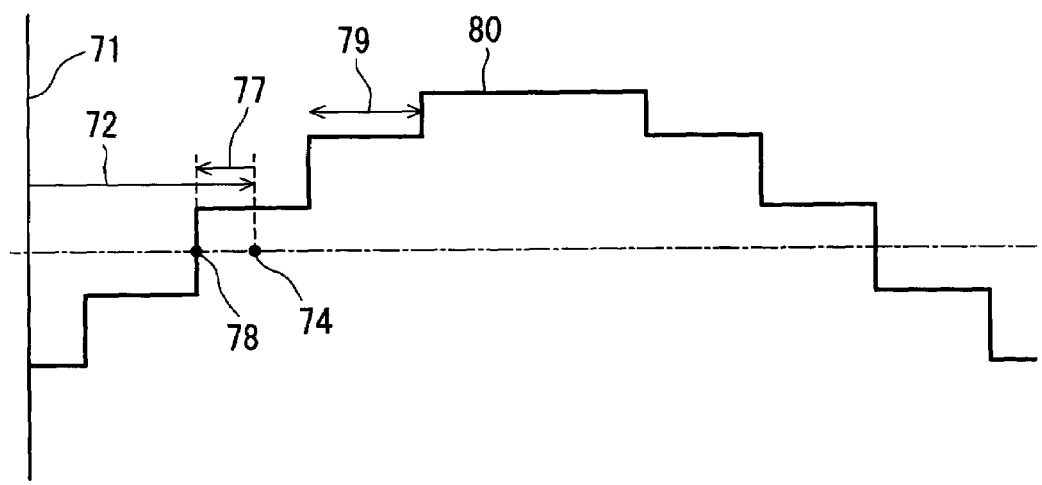
FIG. 7B shows the phase shifting in accordance with Embodiment of the present invention in the case that the phase of the driving voltage is advanced.

Referring to FIGS. 7A and 7B, the controls for delaying the phase and advancing the phase will be explained in detail. FIG. 7A shows the voltage command waveform 76 in the case that the phase is delayed. FIG. 7B shows the voltage command waveform 80 in the case that the phase is advanced.

As shown in FIGS. 7A and 7B, by switching the switches 407, 408, and 409 via the control terminals 417, 418, and 419, the voltage command waveforms 76 and 80 having pseudo sine waveforms obtained by equally dividing 1 cycle by a unit angle 79 are formed. A rotor position edge signal 71 and a previous phase control quantity 72 are illustrated. In the case that the current edge signal advances from the current edge target signal (not shown) by the phase difference 73, the zero crossing point of a new voltage command waveform 76 is set at the point 75 that is delayed from the zero crossing point 74 of a previous voltage command waveform by the phase difference 73 to form the voltage command waveform 76. Furthermore, in the case that the current edge signal delays from the current edge target signal (not shown) by the phase difference 77, the zero crossing point of a new voltage command waveform 80 is set at the point 75 advanced from the zero crossing point 74 of a previous voltage command waveform by the phase difference 77 to form the voltage command waveform 80.

Figure 8:
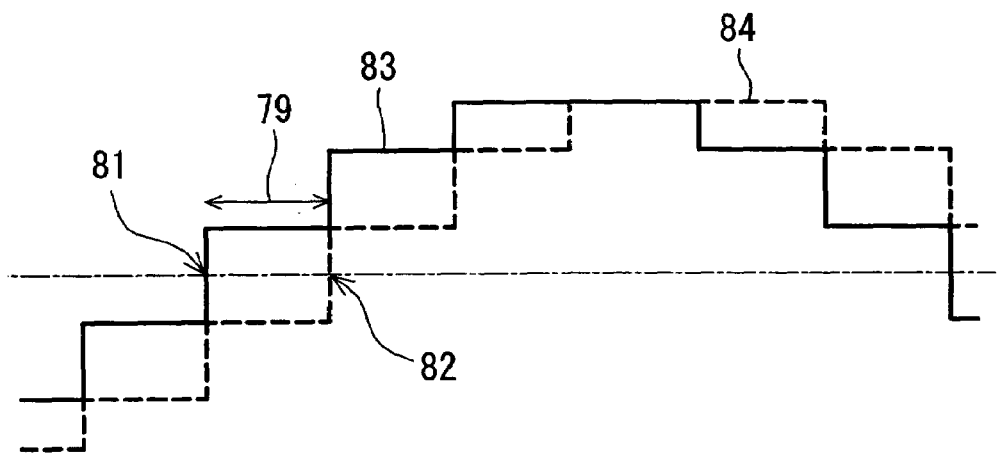
FIG. 8 shows the phase shifting in accordance with the motor driving devices of the first prior art in the case that the phase of the driving voltage is delayed.

The phase control described above is executed in much smaller unit than the unit angle 79 (each switching timing of the switches 407, 408, and 409 is controlled using the much smaller time than the time corresponding to the unit angle 79 as a unit). FIG. 8 shows the voltage command waveform 83 in the case that the phase control is executed using the unit angle 79. In FIG. 8, since the minimum unit angle 79 of the voltage command waveform 83 for controlling the start timing is large, the zero crossing point of the new voltage command waveform 84 (indicated as a broke line) is not capable to be set at middle of the points 81 and 82. The start timing of the voltage command waveform 84 becomes the point 82, thereby the jitter thereof becomes large. In the Embodiment of the present invention, as shown in FIGS. 7A and 7B, the phase control is executed using the much smaller unit than the unit angle 79, thereby the jitter of the voltage command waveform is small.

Figure 9:
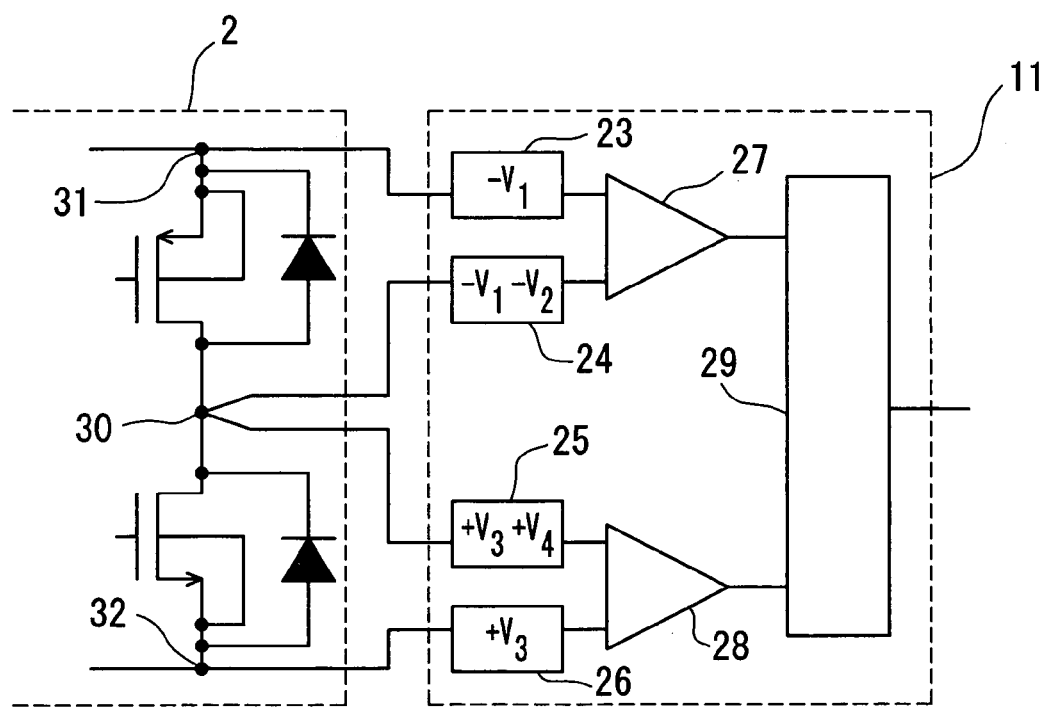
FIG. 9 shows a configuration of a current phase detector in accordance with Embodiment of the present invention.

Next, the configuration of the current phase detector 11 will be described below. FIG. 9 is a block diagram showing the configuration of the current phase detector 11 (the current edge detector) in accordance with the Embodiment of the present invention. To drive the motor with maximum efficiency, it is important to detect the zero crossing points in the phase current shown in part B of FIG. 2 with accuracy. The current phase detector 11 in accordance with the Embodiment of the present invention detects the zero crossing points with accuracy by the configuration described below with a circuit that is low in cost and small in size.

In FIG. 9, the current phase detector 11 includes a first potential shifting part 23, a second potential shifting part 24, a third potential shifting part 25, a fourth potential shifting part 26, a comparator 27, a comparator 28, and a processing part 29.

The first potential shifting part 23 inputs the potential of the high potential side common connection terminal of the motor driving part 2 and shifts the potential by a first voltage. The second potential shifting part 24 inputs the potential of the stator winding driving terminal and shifts the potential by a second voltage. The third potential shifting part 25 inputs the potential of the stator winding driving terminal and shifts the potential by a third voltage. The fourth potential shifting part 26 inputs the potential of the low potential side common connected terminal of the motor driving part 2 and shifts the potential by a fourth voltage. The comparator 27 inputs the output voltage of the first potential shifting part 23 and the output voltage of the second potential shifting part 24 to compare the output voltages, and outputs the comparison result. The comparator 28 inputs the output voltage from the third potential shifting part 25 and the output voltage from the fourth potential shifting part 26 to compare the output voltages, and outputs the comparison result.

In the Embodiment of the present invention, the first potential shifting part 23 drops the potential of the high potential side common connection terminal by the voltage V1 (>0). The second potential shifting part 24 drops the potential of the stator winding driving terminal by the voltage V1+V2 (>0). The fourth potential shifting part 26 raises the potential of the low potential side common connection terminal by the voltage V3 (>0). The third potential shifting part 25 raises the potential of the stator winding driving terminal by the voltage V3+V4 (>0).

For example, the comparator that uses the potential of the high potential side common connection terminal and the potential of the low potential side common connection terminal as a power source, is not capable to output an accurate comparison result unless the potentials of the signals that are input to a non-inverting input terminal and an inverting input terminal are smaller than the potential of the high potential side common connection terminal by the voltage V5 (>0) or more and are larger than the potential of the low potential side common connection terminal by the voltage V6 (>0) or more. Therefore, the voltages V1 to V4 are set such that the voltages V1 to V6 satisfy the conditional equations V5<V1<V1+V2 and V6<V3<V3+V4. The description about the value of voltages V2 and V4 will be described hereinafter.

The potential of the stator winding driving terminal varies widely from a high potential to a low potential by PWM driving, and swings higher than the potential of high potential side common connection terminal and lower than the potential of low potential side common connection terminal when the regenerative current flows. The inventor focuses attention on that the end of the time area in which the potential of the stator winding driving terminal becomes higher than the potential of the high potential side common connection terminal and the end of the time area in which the potential of the stator winding driving terminal becomes lower than the potential of the low potential side common connection terminal correspond to the zero crossing points of the phase current in motors. By detecting the ends of these areas, the zero crossing points of phase current are capable to be detected.

However, in motors that are small in size, the product of the value of on-resistance and the value of the regenerative current is small.

Therefore, the zero crossing points of the phase current are not capable to be detected with high accuracy by simply comparing the potential of the motor driving terminal to the potential of the high potential side common connected terminal with the comparator or simply comparing the potential of the motor driving terminal to the potential of the low potential side common connected terminal with the comparator. This is caused by chattering of the comparison result output from the comparator due to the noise superimposed to the potential of the stator winding driving terminal, the dispersion of the offset potential on latter parts of the comparator etc.

The current phase detector 11 in accordance with the Embodiment of the present invention detects the end of the time area in which the potential of the stator winding driving terminal is higher than the potential of the high potential side common connection terminal and the end of the time area in which the potential of the stator winding driving terminal is lower than the potential of the low potential side common connection terminal with high accuracy by utilizing a forward drop voltage of the regenerative diode that provides the potential difference of several hundreds mV when the regenerative current occurs. The operation of the current phase detector 11 will be described below referring to waveforms in FIG. 10.

Figure 10:
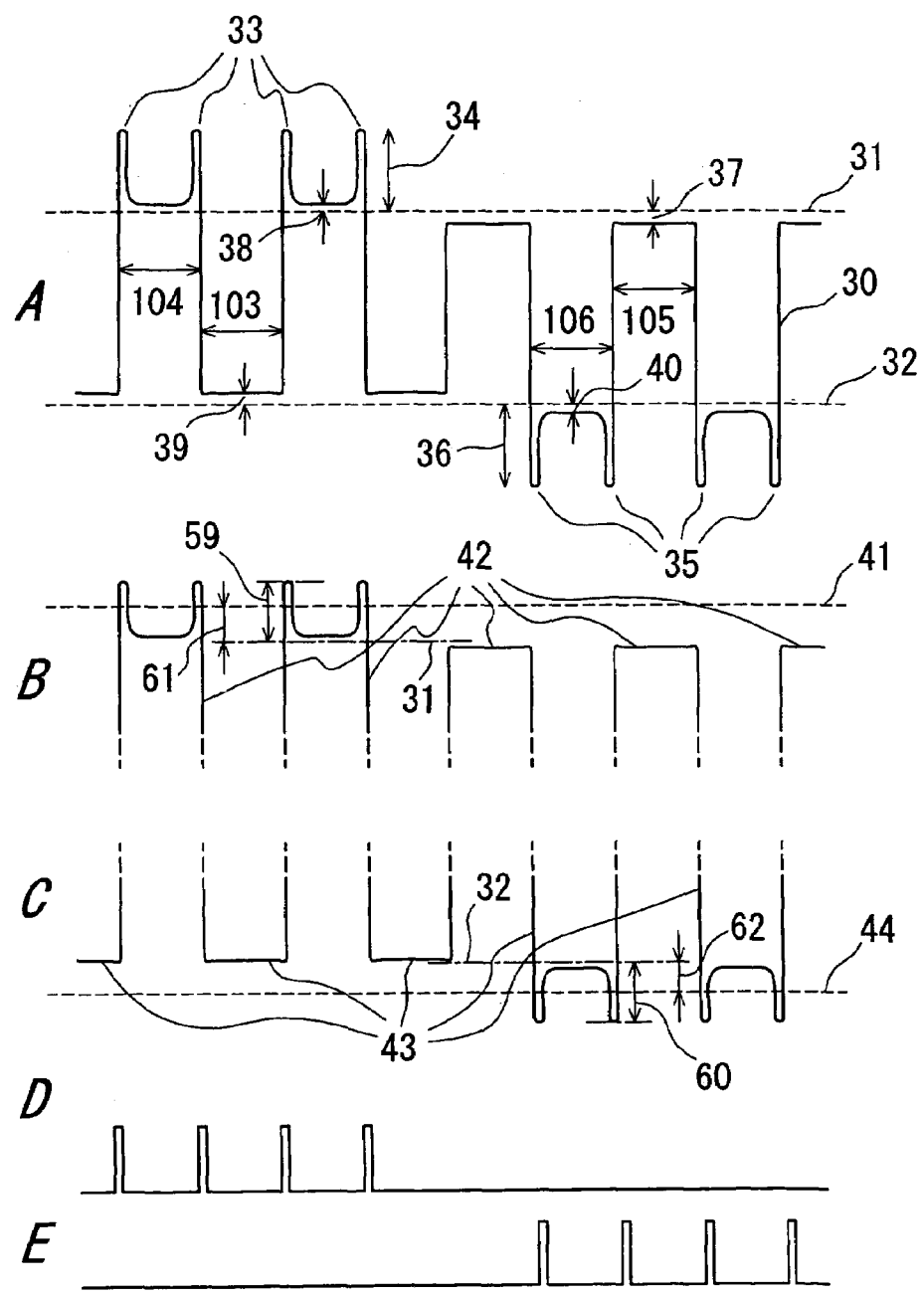
FIG. 10 is a timing chart showing waveforms at each point of the current phase detector in accordance with Embodiment of the present invention.

In part A of FIG. 10, a waveform 30 indicates the signal of the stator winding driving terminal voltage, a broken line 31 indicates the potential of the high potential side common connection terminal, and a broken line 32 indicates the potential of the low potential side common connection terminal potential. The switching timing for the phase current direction of the stator winding is detected according to the peak 33 at which the driving terminal voltage 30 becomes higher than the potential of the high potential side common connection terminal and the peak 35 at which the driving terminal voltage 30 becomes lower than the potential of the low potential side common connection terminal.

A period 103 indicates a period in which the low potential side drive transistor of this phase absorbs a current from the stator winding of this phase and supplies a current to the low potential side common connection terminal. A period 104 indicates a period in which the high potential side drive transistor or the high potential side regenerative diode of this phase absorbs a current from the stator winding of this phase and supplies a current to the high potential side common connection terminal. A period 105 indicates a period in which the high potential side drive transistor of this phase absorbs a current from the high potential side common connection terminal and supplies a current to the stator winding of this phase. A period 106 indicates a period in which the low potential side drive transistor or the low potential side regenerative diode of this phase absorbs a current from the low potential side common connection terminal and supplies a current to the stator winding of this phase.

The peak 33 indicates a peak of potential rising at the stator winding driving terminal due to the regenerative current flowing in the regenerative diode that is connected in parallel to the high potential side drive transistor. The voltage 34 indicates a forward drop voltage from the peak 33 to the potential 31 of the high potential side common connection terminal. The peak 35 indicates a peak of potential dropping at the stator winding driving terminal due to the regenerative current flowing in the regenerative diode that is connected in parallel to the low potential side drive transistor. The voltage 36 indicates the forward drop voltage from the peak 35 to the potential 32 of the high potential side common connection terminal. FIG. 10 shows an example in the case that a synchronous rectifying driving is applied.

A voltage 37 indicates a drop voltage due to the high potential side drive transistor while the energy is stored. A voltage 38 indicates a raise voltage due to the high potential side drive transistor while the regenerative current flows. A voltage 39 indicates a raise voltage due to the low potential side drive transistor while the energy is stored. A voltage 40 indicates a drop voltage due to the low potential side drive transistor while the regenerative current flows. All potentials 37 to 40 are smaller than the voltages 34 and 36. In particular, the potentials 37 to 40 become significantly small on-voltage for a small current.

As described above, it is difficult to detect the small voltages 37, 38, 39, and 40 with stability, due to the noise and the offset dispersion of the comparator. On the other hand, the potential difference 34 between the upper peak 33 and the potential 31 of the high potential side common connection terminal, and the potential difference 36 between the lower peak 35 and the potential 32 of the low potential side common connection terminal have logarithmic characteristics for the current flowing in the stator winding. Therefore the potential differences 34 and 36 stand at several hundreds mV even if the current flowing in the stator winding is significantly small. The current phase detector 11 in accordance with the Embodiment of the present invention detects these upper and lower peaks and detects the zero crossing points of the phase current according to these peaks.

In part B of FIG. 10, a broken line 41 indicates a potential obtained by getting the potential 31 of the high potential side common connection terminal shown in part A of FIG. 10 through the first potential shifting part 23 shown in FIG. 9. A waveform 42 indicates a signal obtained by getting the voltage 30 of the stator winding driving terminal shown in part A of FIG. 10 through the second potential shifting part 24 shown in FIG. 9. Part B of FIG. 10 shows the waveforms near the potential 31 of the high potential side common connection terminal.

In part C of FIG. 10, a waveform 43 indicates a waveform obtained by getting the voltage 30 of the stator winding driving terminal shown in part A of FIG. 10 through the third potential shifting part 25 shown in FIG. 9. A broken line 44 indicates a potential obtained by getting the potential 32 of the low potential side common connection terminal shown in part A of FIG. 10 through the fourth potential shifting part 26 shown in FIG. 9. Part C of FIG. 10 shows the waveforms near the potential 32 of the low potential side common connection terminal. Voltages 59 and 60 indicate voltages obtained by getting the voltages 34 and 36 shown in part A of FIG. 10 through the potential shifting parts 24 and 25, respectively.

In the Embodiment of the present invention, the potential 41 of the high potential side common connection terminal that is dropped by the voltage V1 at the first potential shifting part 23 is positioned almost at the center of the voltage 59 of the potential 42 of the stator winding driving terminal that is dropped by voltage (V1+V2) at the second potential shifting part 24. That is, the voltage V2 is decided to a value that is almost a half of the voltage 59.

The potential 44 of the low potential side common connection terminal that is raised by the voltage V3 at the fourth potential shifting part 26 is positioned almost at the center of the voltage 62 of the potential 43 of the stator winding driving terminal that is raised by voltage (V3+V4) at the third potential shifting part 25. That is, the voltage V4 is decided to a value that is almost a half of the voltage 60.

The comparators 27 and 28 detect the upper peak 33 and the lower peak 35 of the potential of the stator winding driving terminal with accuracy, respectively, without being affected by noise etc. The potential differences 61 (=V2) and 62 (=V4) shown in parts B and C of FIG. 10 are set within the range from 5 to 80% of the forward drop voltages 59 and 60 of the peaks 33 and 35, respectively.

Part D of FIG. 10 shows a signal representing a comparison result obtained by comparing the voltages 41 and 42 shown in part B of FIG. 10 at the comparator 27. Part E of FIG. 10 shows a signal representing a comparison result obtained by comparing the voltage 43 and 44 shown in part C of FIG. 10 at the comparator 28. In such a way, the comparison results without chattering are capable to be obtained, as shown in parts D and E of FIG. 10.

The processing part 29 inputs the signals output from the comparators 27 and 28 (shown in parts D and E of FIG. 10), and outputs a current phase signal including information of the zero crossing points of the phase current.

Figure 11:
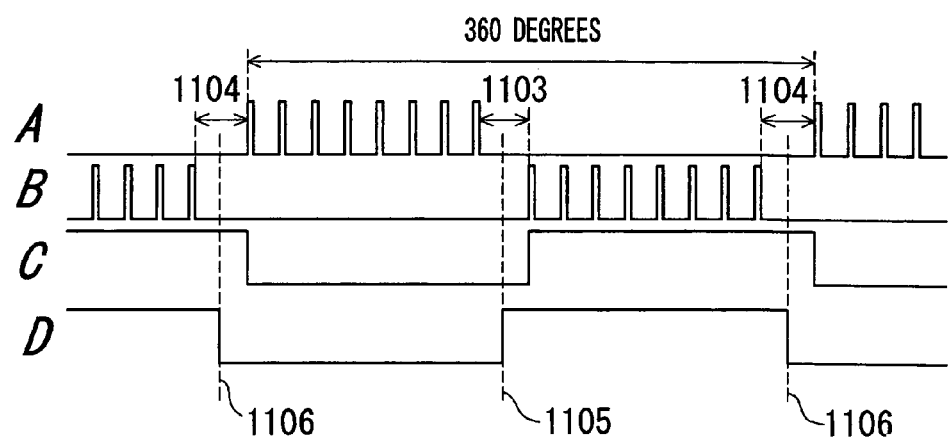
FIG. 11 is a timing chart showing waveforms at each point of the current phase detector in accordance with Embodiment of the present invention.

Now, FIG. 11 is explained. Parts A and B of FIG. 11 show signals shown in parts D and E of FIG. 10 regarding the time that is longer than 1 cycle of the motor electrical angle in the case that the PWM duty ratio of the stator winding drive transistor is always less than 100%. The processing part 29 includes an R-S flip-flop. The processing part 29 inputs the signals shown in parts A and B of FIG. 11 as the set input signal and the reset input signal, respectively, and outputs a current phase signal shown in part C of FIG. 11. The processing part 29 outputs a current phase signal that zero-crosses at the moment that the flowing direction of the phase current is switched.

Figure 12:
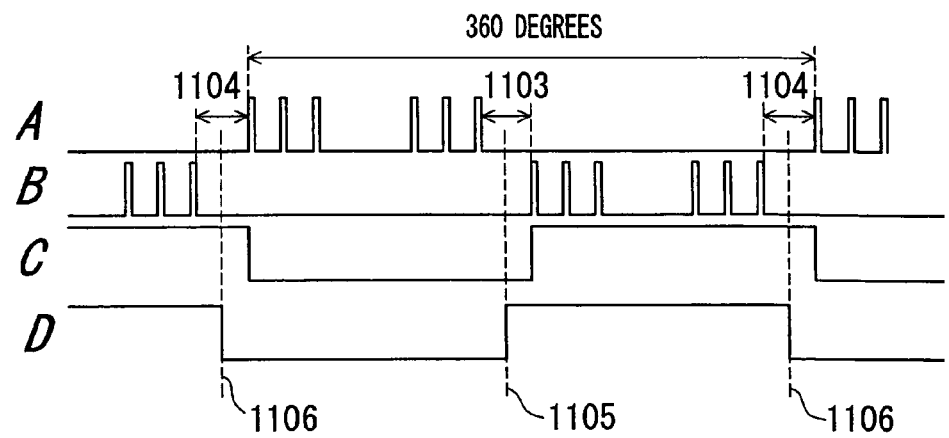
FIG. 12 is a timing chart showing other waveforms at each point of the current phase detector in accordance with Embodiment of the present invention.

Parts A and B of FIG. 12 show signals shown in parts D and E of FIG. 10 regarding the time that is longer than 1 cycle of the motor electrical angle in the case that the period in which the PWM duty ratio of the stator winding drive transistor becomes 100% is included. The processing part 29 inputs the signals shown in parts A and B of FIG. 12 and outputs a current phase signal shown in part C of FIG. 12.

The processing part 29 may input the signals shown in parts A and B of FIG. 11, execute the low-pass filtering, and generate a current phase signal. Alternatively, the processing part 29 may latch the signals shown in parts B and C of FIG. 10 via single-shot using signals shown in parts A and B of FIG. 11 as clock signals to generate a current phase signal. In this case, the circuit can be constituted by only either one of the comparators 27 and 28.

In the case that the rotation speed of the motor is low, a section 1103 between the last pulse in the pulse generating section in part A of FIG. 11 and the first pulse in the pulse generating section in part B of FIG. 11, and a section 1104 between the last pulse in the pulse generating section in part B of FIG. 11 and the first pulse in the pulse generating section in part A of FIG. 11 tend to be unignorable, compared with a 360-degree section. The processing part 29 generates a current phase signal that zero-crosses at a center point 1105 of the section 1103, and a center point 1106 of the section 1104. The processing part 29 measures the lengths of the sections 1103 and 1104, and determines the timings of the center points 1105 and 1106. The processing part 29 generates the current phase signal that zero-crosses at the center points 1105 and 1106. The current phase signal that zero-crosses at the center points 1105 and 1106 is illustrated in part D of FIG. 11.

Also in parts A and B of FIG. 12, the processing part 29 generates a current phase signal that zero-crosses at the center point 1105 of the section 1103 and the center point 1106 of the section 1104 in the similar way. The current phase signal that zero-crosses at the center points 1105 and 1106 is illustrated in part D of FIG. 12.

Figure 13:
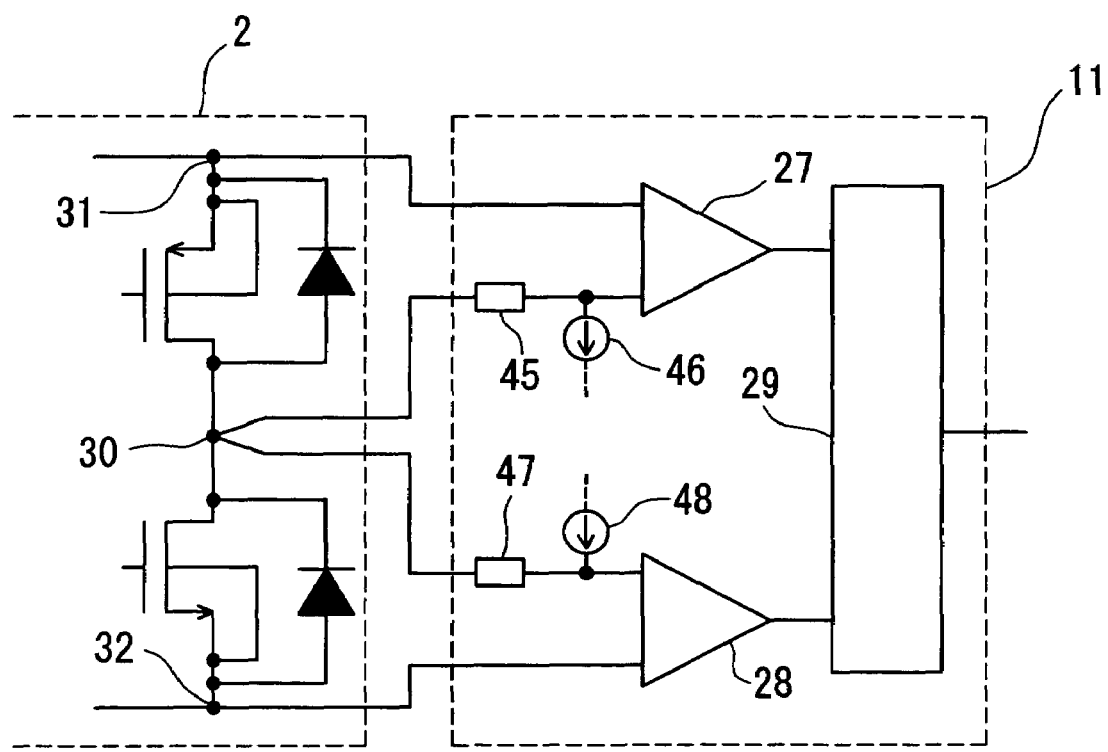
FIG. 13 shows a specific configuration of the current phase detector in accordance with Embodiment of the present invention.
Figure 14:
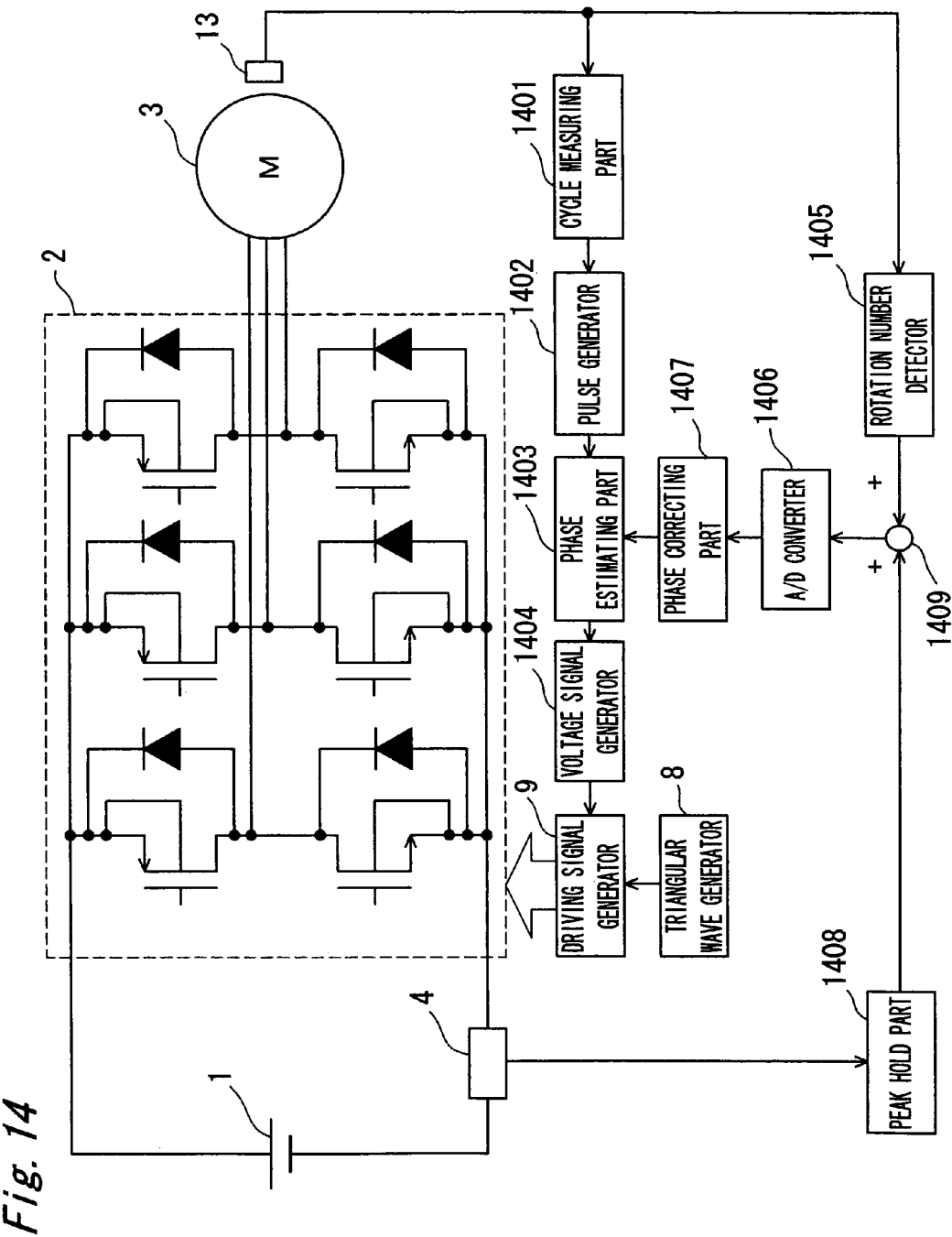
FIG. 14 is a block diagram showing a configuration of the motor driving device of the first prior art.
Figure 15:
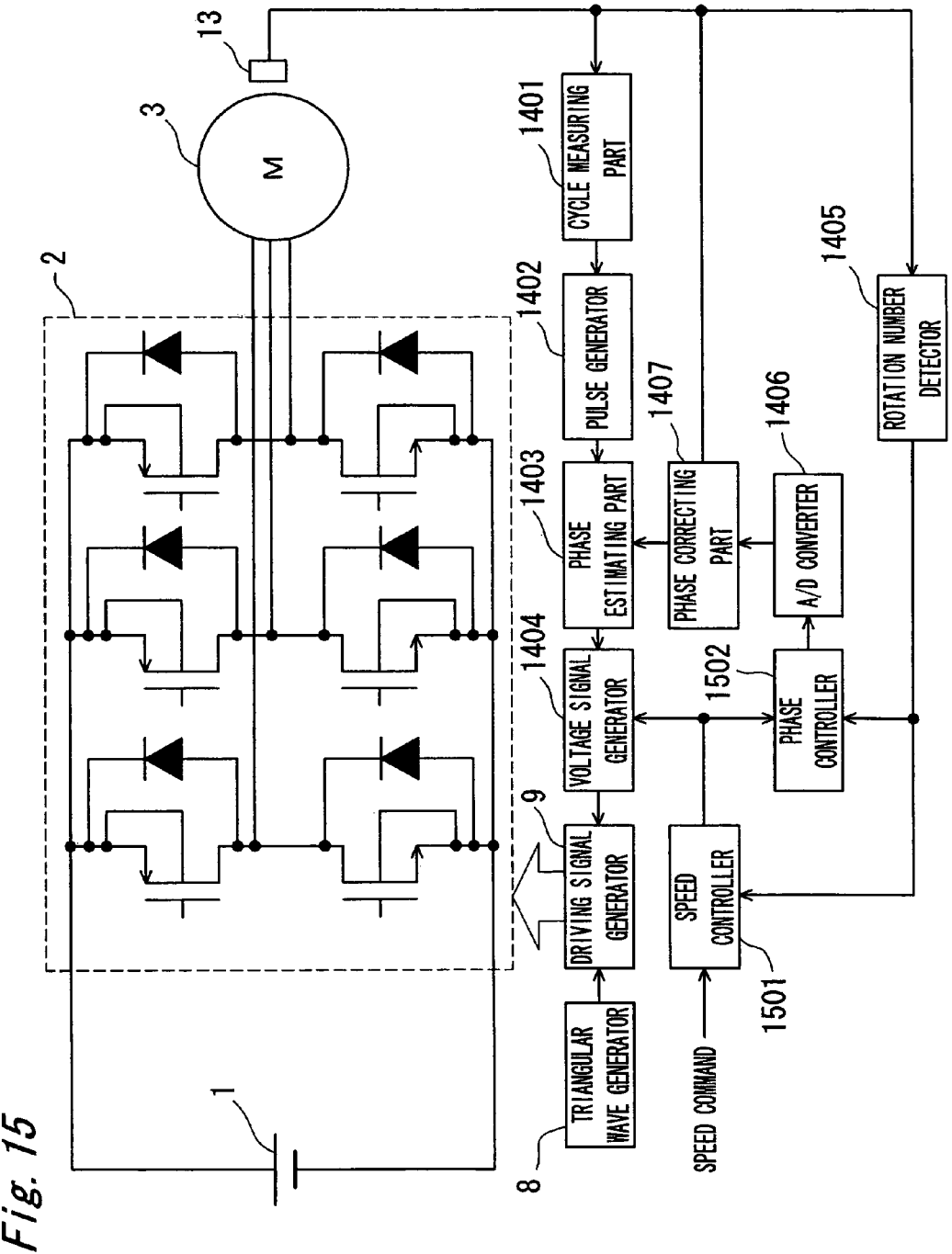
FIG. 15 is a block diagram showing a configuration of the motor driving device of the second prior art.

FIG. 13 more specifically shows the configuration of the potential shifting part in the voltage signal generator 10 shown in FIG. 9. The first potential shifting part 23 and the fourth potential shifting part 26 in FIG. 9 are omitted (V1=V3=0). The second potential shifting part 24 drops the voltage 30 of the stator winding driving terminal by V2 (=V1+V2) using the combination of a resistor 45 and a current source 46, and outputs the signal shown in part B of FIG. 10. The third potential shifting part 25 raises the voltage 30 of the stator winding driving terminal by V4 (=V3+V4) using the combination of a resistor 47 and a current source 48, and outputs the signal shown in part C of FIG. 10.

In this embodiment, the elements 45 and 47 are resistors. Alternatively, any circuit elements that generate the potential difference when a current is supplied may be used as the elements 45 and 47.

The specific configuration of each potential shifting part 23 to 26 in FIG. 9 is not limited to the configuration shown in FIG. 13. Any configuration that is capable to realize the potential relations shown in parts B and C of FIG. 10 can be applied. For example, two potential shifting parts 23 and 26 may be deleted. The comparators 27 and 28 that are the latter stages of the potential shifting parts may preliminarily include a predetermined offset voltage. In this case, all or several of the potential shifting parts 23 to 26 may be deleted. In the case that the PWM duty ratio is certainly less than 100%, the circuit may be configured by either one of the comparators 27 and 28.

Although the current waveform is sine-wave in description of the Embodiment of the present invention, alternatively the current waveform that is not sine-wave is also available. However, a motor driving device that is low in noise and vibration and high in efficiency can be realized by the combination of sine-wave driving with the present invention.

The motor driving device according to the Embodiment of the present invention is a driving device of a spindle motor for an optical disk. Alternatively, the motor driving device according to the Embodiment of the present invention is capable to be applied to a driving device of a motor for a disk device for any disk except for an optical disk, or other device.

The motor driving device and the motor driving method of the present invention can be used as a motor driving device and a motor driving method of an optical disk device. The motor driving device and the motor driving method of the present invention also can be used as a device for an optical disk and a method for controlling an optical disk.

In accordance with the present invention, an advantageous effect that a motor driving device and a motor driving method that is low in cost and high in efficiency can be realized by keeping the phase difference between the phase of a phase current and a rotor position signal to a predetermined phase difference at any time.

In accordance with the present invention, an advantageous effect that a motor driving device and a motor driving method that is low in cost and high in efficiency can be realized without depending on the characteristic of the motor.

In accordance with the present invention, an advantageous effect that an electronic apparatus that is low in cost and high in efficiency can be realized.

The disclosure of Japanese Patent Application No. 2004-177018 filed Jun. 15, 2004 including specification, drawings and claims is incorporated herein by reference in its entirety.

Although the present invention has been described in terms of the presently preferred embodiments, it should be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A motor driving device, comprising:
 a motor driving part having a plurality of half bridge circuits in which a high potential side drive transistor and a low potential side drive transistor are connected in series to each other, and a connection point therebetween serves as a stator winding driving terminal of each phase of a motor;
 a rotor position detector for detecting a rotor position of said motor and outputting a rotor position signal;
 a current phase detector for detecting the phase of a phase current flowing in said stator winding driving terminal;
 a voltage signal generator for controlling and generating a voltage profile signal such that a first phase difference that is a difference between the phase of said phase current and the phase of said rotor position signal is kept to a predetermined electrical angle; and a driving signal generator for generating a PWM signal that drives said drive transistor of each phase depending on said voltage profile signal.

2. The motor driving device of claim 1, wherein
said voltage signal generator comprises:
a current edge target signal generator for generating a current edge target value that is a target value for zero crossing timing of the motor phase current based on said rotor position signal;
a phase difference detector for detecting a second phase difference that is a difference between a current edge being the zero crossing timing of a measured phase current and said current edge target value; and
a voltage shaping part for generating a voltage profile signal having a phase advanced from a phase of said rotor position signal by a predetermined quantity, said predetermined quantity is a corrected value of a certain quantity according to said second phase difference.

3. The motor driving device of claim 1, wherein
in a state that no feedback of said phase difference for controlling the phase is executed, the voltage signal generator initializes the phase of a current phase signal so as to be further advanced from the phase of said rotor position signal by a first predetermined period more than said predetermined quantity, and generates said voltage-profile signals to start electrifying.

4. The motor driving device of claim 3, wherein
said voltage signal generator, in the case that said first phase difference is not kept to said predetermined electrical angle and the phase of said phase current delays by said predetermined electrical angle or more even outputting a driving voltage having a phase advanced by said first predetermined period,
shifts the range of phase adjustment when starting the electrification by mode switching, wherein
a second predetermined period obtained by further advancing an electrification start phase of said voltage profile signal by more than said first predetermined period is set as a reference,
a value for amending a phase difference that is an advanced phase of said voltage profile signal from said rotor position signal is replaced to an amendment value that is a further delayed phase from a previous phase amendment value by a phase corresponding to a difference between said first predetermined period and said second predetermined period, and said voltage profile signal is generated using said replaced amendment value.

5. The motor driving device of claim 1, wherein
said voltage signal generator feeds back the difference between said first phase difference and said predetermined electrical angle to the phase or a start timing of said voltage profile signal to execute the control.

6. The motor driving device of claim 1, wherein said current phase detector detects a current phase regarding at least one phase of the motor.

7. The motor driving device of claim 1, wherein
said motor driving part has a plurality of pairs, each pair has a drive transistor that drives a phase current flowing in a stator winding of each phase of the motor and a regenerative diode connected in parallel to said drive transistor,
said current phase detector compares a potential of either end or a potential difference between both ends of said regenerative diode resulting from that a regenerative current flows in said regenerative diode in forward direction, and deriving and outputting said phase of the phase current based on the comparison result.

8. The motor driving device of claim 1, wherein
said motor driving part has a plurality of half bridge circuits in which a high potential side drive transistor and a low potential side drive transistor are connected in series to each other, and a connection point therebetween serves as a stator winding driving terminal of each phase of a motor, and a regenerative diode is connected in parallel to each of said drive transistors,
said current phase detector has a potential shift circuit shifting a potential of either end or potentials of both ends of said high potential side regenerative diode and a potential of either end or potentials of both ends of said low potential side regenerative diode by a predetermined voltages that are different from each other, respectively, a comparator for comparing the output signal from said potential shift circuit to a predetermined threshold, and a phase current phase detecting circuit inputting the output signal from said comparator, and deriving and outputting the phase of a phase current.

9. The motor driving device of claim 1, wherein
said motor driving part has a plurality of half bridge circuits in which a high potential side drive transistor and a low potential side drive transistor are connected in series to each other, and a connection point therebetween serves as a stator winding driving terminal of each phase of a motor, and a regenerative diode is connected in parallel to each of said drive transistors,
said current phase detector comparing a potential obtained by giving a first offset voltage to the voltage of at least one phase of the stator winding driving terminal to a predetermined threshold, and deriving and outputting the phase of a phase current based on comparison result.

10. The motor driving device of claim 1, wherein
said motor driving part has a plurality of half bridge circuits in which a high potential side drive transistor and a low potential side drive transistor are connected in series to each other, and a connection points therebetween serves as a stator winding driving terminal of each phase of a motor, and a regenerative diode is connected in parallel to each of said drive transistors,
said current phase detector deriving and outputting the phase of a phase current based on a first comparison result obtained by comparing potential obtained by giving a first offset voltage to the voltage of at least one phase of the stator winding driving terminal to a first threshold, and a second comparison result obtained by comparing potential obtained by giving a second offset voltage to the voltage of said stator winding driving terminal to a second threshold.

11. The motor driving device of claim 1, wherein
said motor driving part has a plurality of half bridge circuits in which a high potential side drive transistor and a low potential side drive transistor are connected in series to each other, and a connection point therebetween serves as a stator winding driving terminal of each phase of a motor, and a regenerative diode is connected in parallel to each of said drive transistors,
said current phase detector has
a potential shift circuit inputting anode potential of said regenerative diode that is connected in parallel to said high potential side drive transistor, and outputting potential dropped from said anode potential by a predetermined voltage that is smaller than the forward drop voltage of said regenerative diode;
a comparator comparing a potential output from said potential shift circuit and a potential of high potential side common connection terminal of said high potential side drive transistor; and
a phase current phase detecting circuit inputting comparison result of said comparator, and deriving and outputting said phase of the phase current.

12. The motor driving device of claim 1, wherein
said motor driving part has a plurality of half bridge circuits in which a high potential side drive transistor and a low potential side drive transistor are connected in series to each other, and a connection point therebetween serves as a stator winding driving terminal of each phase of a motor, and a regenerative diode is connected in parallel to each of said drive transistors,
said current phase detector has
a potential shift circuit inputting a cathode potential of said regenerative diode that is connected in parallel to said low potential side drive transistor, and outputting a potential raised from said cathode potential by a predetermined voltage that is smaller than the forward drop voltage of said regenerative diode;
a comparator for comparing a potential output from said potential shift circuit and a potential of low potential side common connection terminal of said low potential side drive transistor; and
a phase current phase detecting circuit inputting comparison result of said comparator, and deriving and outputting said phase of the phase current.

13. A motor driving device, comprising:
a motor driving part having a plurality of pairs, each pair has a drive transistor that drives a phase current flowing in a stator winding of each phase of a motor and a regenerative diode that is connected in parallel to said drive transistor;
a current phase detector for comparing the potential of either end or the potential difference of both ends of said regenerative diode resulting from that a regenerative current is flowing in said regenerative diode in forward direction to a predetermined threshold, derives and outputs the phase of the phase current based on the comparison result; and
a voltage signal generator outputting a voltage to be applied to said motor driving part based on said phase of the phase current.

14. The motor driving device of claim 13, wherein
said motor driving part has a plurality of half bridge circuits in which a high potential side drive transistor and a low potential side drive transistor are connected in series to each other, and a connection point therebetween serves as a stator winding driving terminal of each phase of a motor, and a regenerative diode is connected in parallel to each of said drive transistors,
said current phase detector has
a potential shift circuit inputting an anode potential of said regenerative diode that is connected in parallel to said high potential side drive transistor, and outputting a potential dropped from said anode potential by a predetermined voltage that is smaller than the forward drop voltage of said regenerative diode;
a comparator for comparing a potential output from said potential shift circuit to a potential of high potential side common connection terminal of said high potential side drive transistor; and
a phase current phase detecting circuit inputting a comparison result of said comparator, and deriving and outputting said phase of the phase current.

15. The motor driving device of claim 13, wherein
said motor driving part has a plurality of half bridge circuits in which a high potential side drive transistor and a low potential side drive transistor are connected in series to each other, and a connection point therebetween serves as a stator winding driving terminal of each phase of a motor, and a regenerative diode is connected in parallel to each of said drive transistors,
said current phase detector has
a potential shift circuit inputting a cathode potential of said regenerative diode that is connected in parallel to said low potential side drive transistor, and outputting a potential raised from said cathode potential by a predetermined voltage that is smaller than the forward drop voltage of said regenerative diode;
a comparator for comparing a potential output from said potential shift circuit and a potential of low potential side common connection terminal of said low potential side drive transistor; and
a phase current phase detecting circuit inputting comparison result of said comparator, and deriving and outputting said phase of the phase current.

16. A motor driving device, comprising:
a motor driving part having a plurality of half bridge circuits in which a high potential side drive transistor and a low potential side drive transistor are connected in series to each other, and a connection point therebetween serves as a stator winding driving terminal of each phase of a motor, a regenerative diode is connected in parallel to each of said drive transistors;
a current phase detector having a potential shift circuit that shifts the potential of either end or the potentials of both ends of said high potential side regenerative diode, and the potential of either end or the potentials of both ends of said low potential side regenerative diode by predetermined voltages that are different from each other, respectively, a comparator for comparing the output signal from said potential shift circuit to a predetermined threshold, and a phase current phase detecting circuit inputting the output signal from said comparator, and deriving and outputting the phase of a phase current; and
a voltage signal generator outputting a voltage to be applied to said motor driving part based on said phase of the phase current.

17. The motor driving device of claim 16, wherein
said motor driving part has a plurality of half bridge circuits in which a high potential side drive transistor and a low potential side drive transistor are connected in series to each other, and a connection point therebetween serves as a stator winding driving terminal of each phase of a motor, and a regenerative diode is connected in parallel to each of said drive transistors,
said current phase detector has
a potential shift circuit inputting anode potential of said regenerative diode that is connected in parallel to said high potential side drive transistor, and outputting a potential dropped from said anode potential by a predetermined voltage that is smaller than the forward drop voltage of said regenerative diode;
a comparator for comparing a potential output from said potential shift circuit and potential of high potential side common connection terminal of said high potential side drive transistor; and a phase current phase detecting circuit inputting comparison result of said comparator, and deriving and outputting said phase of the phase current.

18. The motor driving device of claim 16, wherein
said motor driving part has a plurality of half bridge circuits in which a high potential side drive transistor and a low potential side drive transistor are connected in series to each other, and a connection point therebetween serves as a stator winding driving terminal of each phase of a motor, and a regenerative diode is connected in parallel to each of said drive transistors,
said current phase detector has
a potential shift circuit inputting a cathode potential of said regenerative diode that is connected in parallel to said low potential side drive transistor, and outputting a potential raised from said cathode potential by a predetermined voltage that is smaller than the forward drop voltage of said regenerative diode;
a comparator for comparing a potential output from said potential shift circuit and a potential of low potential side common connection terminal of said low potential side drive transistor; and
a phase current phase detecting circuit inputting comparison result of said comparator, and deriving and outputting said phase of the phase current.

19. A motor driving device, comprising:
a motor driving part having a plurality of half bridge circuits in which a high potential side drive transistor and a low potential side drive transistor are connected in series to each other, and a connection point therebetween serves as a stator winding driving terminal of each phase of a motor, a regenerative diode is connected in parallel to each of said drive transistors;
a current phase detector for comparing the potential that is obtained by giving a first offset voltage to the voltage of at least one phase of the stator winding driving terminal to a predetermined threshold, and deriving and outputting the phase of a phase current based on the comparison result; and
a voltage signal generator outputting a voltage to be applied to said motor driving part based on said phase of the phase current.

20. A motor driving device, comprising:
a motor driving part having a plurality of half bridge circuits in which a high potential side drive transistor and a low potential side drive transistor are connected in series to each other, and a connection point therebetween serves as a stator winding driving terminal of each phase of a motor, a regenerative diode is connected in parallel to each of said drive transistors;
a current phase detector deriving and outputting the phase of a phase current based on a first comparison result obtained by comparing a potential that is obtained by giving a first offset voltage to the voltage of at least one phase of the stator winding driving terminal to a first threshold, and a second comparison result obtained by comparing potential obtained by giving a second offset voltage to the voltage of said stator winding driving terminal to a second threshold; and
a voltage signal generator outputting a voltage to be applied to said motor driving part based on said phase of the phase current.

21. A motor driving device, comprising:
a motor driving part having a plurality of pairs, each pair has a drive transistor that drives a phase current flowing in a stator winding of each phase of a motor and a regenerative diode that is connected in parallel to said drive transistor;
a current phase detector for comparing the potentials of both ends of said regenerative diode resulting from that a regenerative current flows in said regenerative diode in forward direction after giving a offset voltage to at least either potential, and deriving and outputting the phase of a phase current based on the comparison result; and
a voltage signal generator outputting a voltage to be applied to said motor driving part based on said phase of the phase current.

22. A motor apparatus, comprising:
a motor
a motor driving part having a plurality of half bridge circuits in which a high potential side drive transistor and a low potential side drive transistor are connected in series to each other, and a connection point therebetween serves as a stator winding driving terminal of each phase of said motor;
a rotor position detector for detecting a rotor position of said motor and outputting a rotor position signal;
a current phase detector for detecting the phase of a phase current flowing in said stator winding driving terminal;
a voltage signal generator for controlling and generating a voltage profile signal such that a first phase difference that is a difference between the phase of said phase current and the phase of said rotor position signal is kept to a predetermined electrical angle; and
a driving signal generator for generating a PWM signal that drives said drive transistor of each phase depending on said voltage profile signal.

23. A motor apparatus, comprising:
a motor;
a motor driving part having a plurality of pairs, each pair has a drive transistor that drives a phase current flowing in a stator winding of each phase of said motor and a regenerative diode that is connected in parallel to said drive transistor;
a current phase detector for comparing the potentials of both ends of said regenerative diode resulting from that a regenerative current flows in said regenerative diode in forward direction after giving a offset voltage to at least either potential, and deriving and outputting the phase of a phase current based on the comparison result; and
a voltage signal generator outputting a voltage to be applied to said motor driving part based on said phase of the phase current.

24. A motor driving method, comprising:
a) detecting a rotor position of a motor to output a rotor position signal;
b) detecting a phase of a phase current flowing in a stator winding of the motor;
c) generating a voltage signal of a predetermined voltage profile signal to control so that a difference between said phase of the phase current and said phase of the rotor position signal is kept to a predetermined electrical angle; and
d) generating a PWM signal that drives said stator winding of each phase depending on said voltage signal.

25. A motor driving method, comprising:
a) comparing a potential of either end or a potential difference of both ends of a regenerative diode connected in parallel to a drive transistor that drives a phase current flowing in a stator winding of a motor resulting from that a regenerative current flows in said regenerative diode in forward direction to a predetermined threshold, and deriving and outputting a phase of a phase current based on the comparison result; and b) outputting a voltage to be applied to a motor driving part based on said phase of the phase current.

* * * * *